United States Patent
Park et al.

(10) Patent No.: US 11,683,212 B2
(45) Date of Patent: Jun. 20, 2023

(54) METHOD AND APPARATUS FOR APPLYING PHASE ROTATION IN BROADBAND WITH 80MHZ BASED PREAMBLE PUNCTURING PERFORMED IN WLAN SYSTEM

(71) Applicant: LG ELECTRONICS INC., Seoul (KR)

(72) Inventors: Eunsung Park, Seoul (KR); Jinmin Kim, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/268,201

(22) PCT Filed: Aug. 26, 2019

(86) PCT No.: PCT/KR2019/010824
§ 371 (c)(1),
(2) Date: Feb. 12, 2021

(87) PCT Pub. No.: WO2020/045910
PCT Pub. Date: Mar. 5, 2020

(65) Prior Publication Data
US 2021/0320830 A1 Oct. 14, 2021

(30) Foreign Application Priority Data

Aug. 27, 2018 (KR) .................. 10-2018-0100692
Sep. 5, 2018 (KR) .................. 10-2018-0106200

(51) Int. Cl.
*H04L 27/26* (2006.01)
*H04W 84/12* (2009.01)

(52) U.S. Cl.
CPC ...... *H04L 27/2621* (2013.01); *H04L 27/2618* (2013.01); *H04W 84/12* (2013.01)

(58) Field of Classification Search
CPC ............. H04L 27/2621; H04L 27/2618; H04L 27/26025; H04L 27/2603; H04W 84/12
See application file for complete search history.

(56) References Cited

U.S. PATENT DOCUMENTS 10,979,266 B2 * 4/2021 Son ...................... H04L 27/2605
11,272,490 B2 * 3/2022 Verma ................... H04L 1/0057
(Continued)

FOREIGN PATENT DOCUMENTS

KR 1020120085253 7/2012
KR 1020140124842 10/2014
(Continued)

OTHER PUBLICATIONS

PCT International Application No. PCT/KR2019/010824, International Search Report dated Dec. 2, 2019, 6 pages.
(Continued)

*Primary Examiner* — Jay P Patel
(74) *Attorney, Agent, or Firm* — Lee Hong Degerman Kang Waimey

(57) ABSTRACT

A method and an apparatus for transmitting an EHT PPDU to a WLAN system are proposed. Specifically, a transmitter generates and transmits an EHT PPDU to a receiver through a 320 MHz band from which an 80 MHz band is punctured. The EHT PPDU includes a legacy preamble and an EHT field. The legacy preamble includes an L-STF and an L-LTF. The legacy preamble is generated by applying a first phase rotation value. The first phase rotation value is obtained on the basis of a second phase rotation value and a third phase rotation value. The second phase rotation value is a phase rotation value that repeats a phase rotation value defined for the 80 MHz band in an 802.11ax system. The third phase rotation value is a phase rotation value defined in unit of the 80 MHz band in the 320 MHz band on the basis of an
(Continued)

optimal PAPR of the L-STF and L-LTF. The first phase rotation value is [1 1 −1 −1 −j −j j j 1 1 −1 −1 −j −j j j].

13 Claims, 25 Drawing Sheets

(56) References Cited

U.S. PATENT DOCUMENTS

| | | | |
|---|---|---|---|
| 2015/0349995 A1* | 12/2015 | Zhang | H04L 27/2613 375/295 |
| 2016/0165482 A1* | 6/2016 | Yang | H04L 5/00 370/336 |
| 2017/0288745 A1 | 10/2017 | Seok | |
| 2019/0123877 A1* | 4/2019 | Park | H04L 27/26 |
| 2019/0199491 A1* | 6/2019 | Verma | H04L 5/0032 |
| 2019/0253296 A1* | 8/2019 | Chen | H04W 72/0453 |
| 2019/0288892 A1* | 9/2019 | Son | H04L 27/2605 |
| 2019/0364555 A1* | 11/2019 | Huang | H04W 72/048 |
| 2019/0373586 A1* | 12/2019 | Verma | H04B 7/0697 |
| 2020/0045656 A1* | 2/2020 | Verma | H04L 27/2613 |
| 2020/0076551 A1* | 3/2020 | Cherian | H04L 5/0094 |
| 2020/0076552 A1* | 3/2020 | Cherian | H04W 72/044 |
| 2020/0162963 A1* | 5/2020 | Alpert | H04W 28/06 |
| 2021/0112507 A1* | 4/2021 | Verma | H04J 3/067 |
| 2021/0243756 A1* | 8/2021 | Kim | H04W 72/02 |
| 2021/0250125 A1* | 8/2021 | Park | H04L 27/3872 |
| 2021/0306190 A1* | 9/2021 | Son | H04L 5/0023 |

FOREIGN PATENT DOCUMENTS

| | | | | |
|---|---|---|---|---|
| WO | WO-2017079292 A1 * | 5/2017 | | H04L 1/0071 |
| WO | WO-2018084689 A1 * | 5/2018 | | H04L 27/26 |

OTHER PUBLICATIONS

Choi et al., "View on EHT Objectives and Technologies", IEEE 802.11-18/1171r0, Jul. 2018, 13 pages.

Noh et al., "Gamma Phase Rotation for HE PPDU", IEEE 802.11-16/0903r1, Jul. 2016, 26 pages.

* cited by examiner

FIG. 3

| Channel | F₀ (MHz) | North America | Japan | Most of world |
|---|---|---|---|---|
| 1 | 2412 | Yes | Yes | Yes |
| 2 | 2417 | Yes | Yes | Yes |
| 3 | 2422 | Yes | Yes | Yes |
| 4 | 2427 | Yes | Yes | Yes |
| 5 | 2432 | Yes | Yes | Yes |
| 6 | 2437 | Yes | Yes | Yes |
| 7 | 2442 | Yes | Yes | Yes |
| 8 | 2447 | Yes | Yes | Yes |
| 9 | 2452 | Yes | Yes | Yes |
| 10 | 2457 | Yes | Yes | Yes |
| 11 | 2462 | Yes | Yes | Yes |
| 12 | 2467 | No except CAN | Yes | Yes |
| 13 | 2472 | Yes | Yes | Yes |
| 14 | 2484 | Yes | 11b Only | No |

METHOD AND APPARATUS FOR APPLYING PHASE ROTATION IN BROADBAND WITH 80MHZ BASED PREAMBLE PUNCTURING PERFORMED IN WLAN SYSTEM

CROSS-REFERENCE TO RELATED APPLICATIONS

This application is the National Stage filing under 35 U.S.C. 371 of International Application No. PCT/KR2019/010824, filed on Aug. 26, 2019, which claims the benefit of earlier filing date and right of priority to Korean Application Nos. 10-2018-0100692, filed on Aug. 27, 2018 and 10-2018-0106200, filed on Sep. 5, 2018, the contents of which are all hereby incorporated by reference herein in their entirety.

BACKGROUND OF THE DISCLOSURE

Field of the Disclosure

This specification relates to a scheme for transmitting a PPDU in a WLAN system and, most particularly, to a method and device for configuring a phase rotation value being applied to a legacy preamble for a PAPR that is optimized in case of transmitting a PPDU through a broadband having 80 MHz-based preamble puncturing performed therein in a wireless LAN (WLAN) system.

Related Art

In many telecommunication systems, communication networks are used to exchange messages between spatially separated devices. Networks may be classified according to geographical range, which may be, for example, a metropolitan area, a local area, or a personal area. These networks may each be designated as a wide area network (WAN), metropolitan area network (MAN), local area network (LAN), or personal area network (PAN). Networks differ according to switching/routing techniques (e.g., circuit switching versus packet switching) used for interconnection of various network nodes and devices, types of physical mediums employed for transmission (e.g., wired versus wireless), and a set (e.g., Internet protocol suite, synchronous optical networking (SONET), Ethernet, etc.) of communication protocols in use.

Wireless network technologies may include various types of wireless local area networks (WLANs). WLANs may be used to interconnect nearby devices together by employing widely used networking protocols. Various technical features described herein may be applied to any communication standard, such as Wi-Fi or, more generally, any one of the IEEE 802.11 radio protocol groups.

For example, various aspects described herein may be used as part of an IEEE 802.11 protocol, such as an 802.11 protocol that supports orthogonal frequency-division multiple access (OFDMA) communications. For example, the IEEE 802.11ax standard proposed an improved communication environment using OFDMA and downlink multi-user multiple input, multiple output (DL MU MIMO) techniques.

This disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, and a hybrid automatic repeat request (HARQ) technique.

SUMMARY OF THE DISCLOSURE

Technical Objects

This specification proposes to a method and device for transmitting a PPDU through a broadband having 80 MHz-based preamble puncturing performed therein in a wireless LAN (WLAN) system.

Technical Solutions

An example of this specification proposes a method for transmitting a PPDU through a broadband having 80 MHz-based preamble puncturing performed therein.

This embodiment may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

This embodiment is performed by a transmitting device, and the transmitting device may correspond to an AP. A receiving device may correspond to an STA (non AP STA).

This embodiment relates to a method and device for transmitting a PPDU through 240, 320 MHz bands and configuring a phase rotation value being applied to a legacy preamble for a PAPR that is optimized in a case where 80 MHz-based preamble puncturing is performed in the band. The 80 MHz-based preamble puncturing means that a broadband is punctured in 80 MHz band units. Herein, however, the description will be limited only to the 320 MHz band.

A transmitting device generates the EHT Physical Protocol Data Unit (PPDU). The EHT PPDU includes a legacy preamble and an EHT field.

The transmitting device transmits the EHT PPDU to a receiving device through a 320 MHz band having 80 MHz punctured.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The legacy preamble is generated by applying a first phase rotation value. That is, all fields included in the legacy preamble may commonly have the first phase rotation value applied thereto. The first phase rotation value is a phase rotation value that is defined for optimal PAPRs of L-STF and L-LTF. That is, if the PAPRs of L-STF and L-LTF are great (or large), the first phase rotation value may be applied to the legacy preamble in order to minimize the PAPR values.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPR may be ensured for the transmission of 240 MHz/320 MHz bands having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 0 1 +j 0 0 0 −1−j 0 0 0 1 +j 0 0 0 −1−j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0].

In the above-described embodiment, even when the PPDU is being transmitted through a 240 MHz band, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 160/240/320 MHz through the EHT-SIG-B within the PPDU. Additionally, EHT-STF, EHT-LTF, and data field being included in the EHT field may be transmitted and/or received from/in a band (RU) according to a tone plan at 160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

Effects of the Disclosure

According to an embodiment proposed in this specification, by defining a phase rotation value being applied to a legacy preamble in case of transmitting a PPDU through a 240, 320 MHz band having 80 MHz-based preamble puncturing performed therein, a PAPR that is optimized for L-STF and L-LTF may be obtained. Thus, subcarrier efficiency and high throughput may be achieved.

BRIEF DESCRIPTION OF THE DRAWINGS

FIG. 3 illustrates frequency domains used in a WLAN system.

DESCRIPTION OF EXEMPLARY EMBODIMENTS

When it is mentioned that a configuration includes specific elements in this disclosure or when it is mentioned that a certain process includes specific steps, it may mean that any other elements or any other steps may be further included. That is, the terms used herein are merely intended to describe particular embodiments and are not intended to limit the concepts of the present disclosure.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

The following examples of the present disclosure may be applied to various wireless communication systems. For example, the following examples of the present disclosure may be applied to a wireless local area network (WLAN) system. For example, the present disclosure may be applied to IEEE 802.11a/g/n/ac or IEEE 802.11ax. The present disclosure may also be applied to a newly proposed EHT standard or a new WLAN stand which has enhanced IEEE 802.11be.

Hereinafter, technical features of the WLAN system to which the present disclosure may be applied will be described to describe the technical features of the present disclosure.

Figure 1:
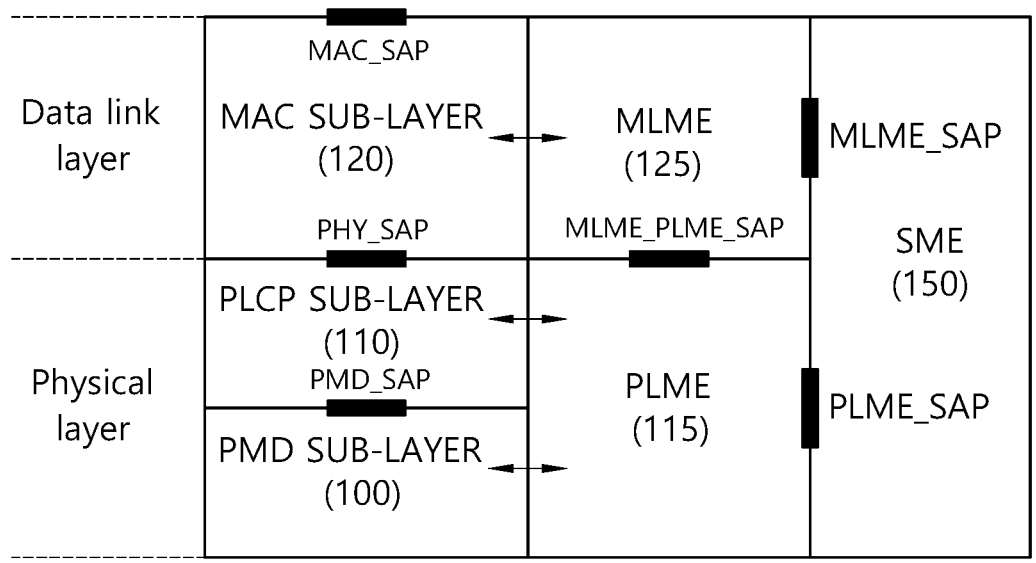
FIG. 1 is a conceptual diagram of a hierarchical architecture of a wireless local area network (WLAN) system supported by IEEE 802.11.

FIG. 1 is a conceptual diagram of a hierarchical architecture of a WLAN system supported by IEEE 802.11. Referring to FIG. 1, a layer architecture of the WLAN system may include a physical medium dependent (PMD) sub-layer 100, a physical layer convergence procedure (PLCP) sub-layer 110, and a medium access control (MAC) sub-layer 120.

The PMD sub-layer 100 may serve as a transmission interface for transmitting and receiving data between a plurality of STAs. The PLCP sub-layer 110 is implemented so that the MAC sub-layer 120 may operate with minimal dependency on the PMD sub-layer 100.

The PMD sub-layer 100, the PLCP sub-layer 110, and the MAC sub-layer 120 may each conceptually include a management entity. For example, the management entity of the MAC sub-layer 120 is referred to as a MAC Layer management entity (MLME) 125. The management entity of the physical layer is referred to as a PHY layer management entity (PLME) 115.

These management entities may provide an interface for performing a layer management operation. For example, the PLME 115 may be connected to the MLME 125 to perform a management operation of the PLCP sub-layer 110 and the PMD sub-layer 100. The MLME 125 may be connected to the PLME 115 to perform a management operation of the MAC sub-layer 120.

In order to perform a proper MAC layer operation, an STA management entity (SME) 150 may exist. The SME 150 may be operated as an independent component for each layer. The PLME 115, the MLME 125, and the SME 150 may transmit and receive information with each other based on a primitive.

A brief description of the operation at each sub-layer is as follows. For example, the PLCP sub-layer 110 delivers a MAC protocol data unit received from the MAC sub-layer 120 to the PMD sub-layer 100 or delivers a frame received from the PMD sub-layer 100 to the MAC sub-layer 120 according to an instruction of the MAC layer between the MAC sub-layer 120 and the PMD sub-layer 100.

The PMD sub-layer 100, as a PLCP sub-layer, may transmit and receive data between a plurality of STAs through a wireless medium. An MPDU delivered by the MAC sub-layer 120 is referred to as a physical service data unit ("PSDU") in the PLCP sub-layer 110. The MPDU is similar to the PSDU, but in a case where an aggregated MPDU (AMPDU) obtained by aggregating a plurality of MPDUs is delivered, individual MPDUs and PSDUs may be different from each other.

In the process of receiving the PSDU from the MAC sub-layer 120 and transmitting the PSDU to the PMD sub-layer 100, the PLCP sub-layer 110 adds an additional field including necessary information by a transceiver of the physical layer. Here, the added field may be a PLCP preamble, a PLCP header, and tail bits required to return a convolutional encoder to a zero state in the PSDU.

The PLCP sub-layer 110 generates a physical (PHY) protocol data unit (PPDU) by adding the aforementioned fields to the PSDU and transmits the PPDU to a receiving station through the PMD sub-layer 100, and the receiving station receives the PPDU and obtains information required for data restoration from the PLCP preamble and the PLCP header to restore the PPDU.

The STA is an arbitrary functional medium including a medium access control (MAC) and a physical layer interface for a wireless medium following regulations of the IEEE (Institute of Electrical and Electronics Engineers) 802.11 standard. In a broad sense, the STA may be used to include both an AP and a non-AP STA.

The STA may be referred to by various names such as a mobile terminal, a wireless device, a wireless transmit/receive unit (WTRU), a user equipment (UE), a mobile station (MS), a mobile subscriber unit, or simply a user.

Figure 2:
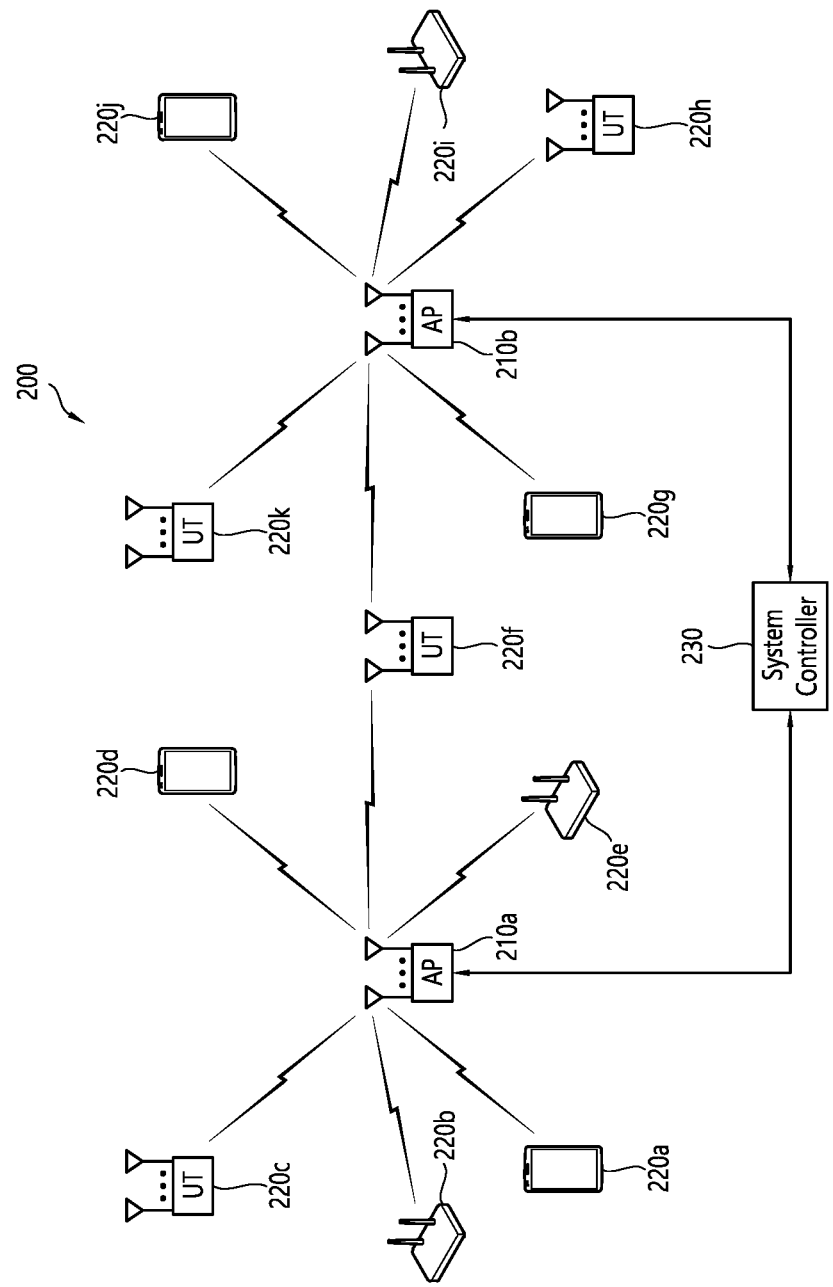
FIG. 2 illustrates an example of a WLAN system.

FIG. 2 illustrates an example of a WLAN system.

As shown, the WLAN system includes at least one access point (AP) and a plurality of STAs (220a/b/c/e/d/f/g/h/i/j/k) associated between the corresponding at least one AP. A plurality of STAs in the example of FIG. 2 may perform functions of an AP and/or a non-AP. The plurality of STAs (220a/b/c/e/d/f/g/h/i/j/k) of FIG. 2 may be referred to by various names such as user terminal (UT) or the like. In addition, at least one STA 220f of FIG. 2 may route/relay communication between a plurality of APs 510a/b, perform control on a plurality of APs, or perform control on an STA connected to a plurality of APs 210a/b.

In addition, the AP 210a/b of FIG. 2 may be connected to a system controller 230 to communicate with another AP or may communicate with another network entity (e.g., a network entity defined by the 3GPP standard or Internet server).

A plurality of STAs illustrated in FIG. 2 may configure a basic service set (BSS).

BSSs are a set of APs and STAs such as APs and STAs that may communicate with each other through successful synchronization and do not refer to a specific area. The BSS may include one or more STAs that may be combined with one AP.

The BSS may include at least one STA, an AP providing a distribution service, and a distributed system connecting a plurality of APs.

A distributed system may configure an extended service set (ESS) by connecting several BSSs. The ESS may be used as a term indicating one network formed by connecting one or several APs through a distributed system. APs included in one ESS may have the same service set identification (SSID).

A portal may serve as a bridge for connecting a WLAN network (IEEE 802.11) and another network (e.g., 802.X).

Even between STAs without an AP, a network may be established to perform communication. Such a network may be referred to as an ad-hoc network or an independent basic service set (IBSS).

FIG. 3 illustrates frequency domains used in a WLAN system.

The WLAN system may use at least one channel defined in the 2.4 GHz band. The 2.4 GHz band may be referred to by other names such as a first band.

As illustrated in FIG. 3, 14 channels may be configured in the 2.4 GHz band. Each channel may be set to a frequency region (or bandwidth) of 20 MHz. $F_0$ may represent a center frequency. The center frequencies of the channels in the 2.4 GHz band may be configured at approximately 5 MHz intervals except for channel 14. Adjacent channels among the 14 channels may overlap each other. An allowable frequency channel or a maximum power level in the allowable frequency channel may be set to be different in each country. For example, channel 13 is not allowed in North America but is allowed in most countries.

The specific values illustrated in the example of FIG. 3 may be changed.

Figure 4:
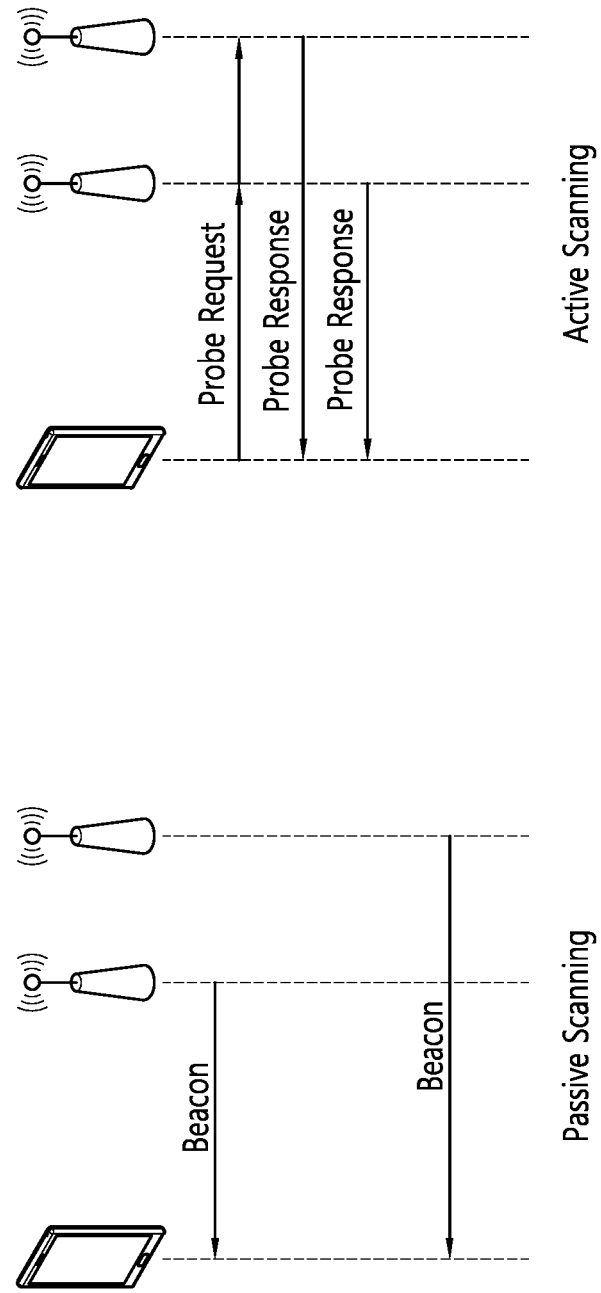
FIG. 4 illustrates an example of network discovery.

FIG. 4 illustrates an example of network discovery.

In order to access the WLAN network, the STA should perform network discovery. Such discovery may be performed through a scanning process for a network. The scanning method may be divided into active scanning and passive scanning.

As illustrated in FIG. 4, the STA that performs active scanning may transmit a probe request frame to search for an AP present in the vicinity, while moving channels, and wait for a response thereto. A responder may transmit a probe response frame to the STA that has transmitted the probe request frame in response to the probe request frame. The responder may be an STA that last transmitted a beacon frame in a BSS of the channel being scanned. In the BSS, since an AP transmits a beacon frame, the AP becomes a responder, and in an IBSS, since STAs in the IBSS transmit beacon frames by taking turns, the responder may be changed.

When the STA transmits the probe request frame through channel #1 and receives the probe response frame through channel #1, the STA may store BSS-related information included in the received probe response frame, move to a next channel (e.g., channel #2), and repeat scanning in the same manner.

As illustrated in FIG. 4, the scanning operation may also be performed by the passive scanning method. An STA that performs scanning based on passive scanning may receive a beacon frame, while moving channels.

The beacon frame is an example of a management frame in IEEE 802.11. The beacon frame may be transmitted periodically. The STA receiving the beacon frame may store BSS-related information included in the received beacon frame, move to a next channel, and perform passive scanning in the next channel.

Although not illustrated in FIG. 4, a number of procedures may be performed after the scanning procedure of FIG. 4.

For example, an authentication process may be performed after the scanning procedure. The authentication process may include a process in which the STA transmits an authentication request frame to the AP and the AP transmits an authentication response frame to the STA in response thereto. An authentication frame used for authentication request/response corresponds to a management frame.

The authentication frames may include information on an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information on various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information on various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 5:
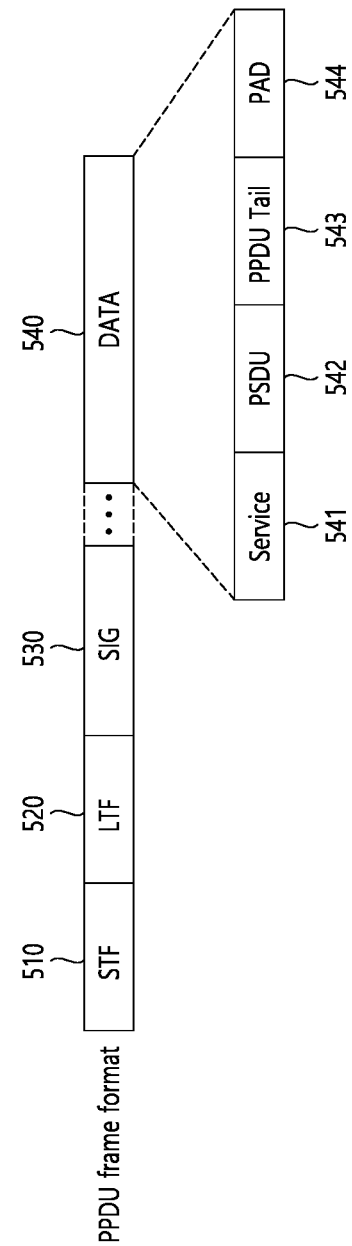
FIG. 5 illustrates an example of a physical protocol data unit (PPDU) transmitted and received by an STA of the present disclosure.

FIG. 5 illustrates an example of a PPDU transmitted and received by an STA of the present disclosure.

An example of FIG. 5 illustrates a typical field of a PPDU, and the order of the fields illustrated in FIG. 5 may be variously changed.

The PPDU of FIG. 5 may include a short training field (STF) 510.

The STF 510 may be embodied as L-STF, HT-STF, VHT-STF, HE-STF, EHT-STF, and the like which will be described later. The STF 510 may be used for frame detection, automatic gain control (AGC), diversity detection, coarse frequency/time synchronization, and the like.

The PPDU of FIG. 5 may include a long training field (LTF) 520.

The LTF 520 may be embodied as L-LTF, HT-LTF, VHT-LTF, HE-LTF, EHT-LTF, and the like which will be described later. The LTF 520 may be used for fine frequency/time synchronization and channel prediction.

The PPDU of FIG. 5 may include an SIG 530.

The SIG 530 may be embodied as L-SIG, HT-SIG, VHT-SIG, HE-SIG, EHT-SIG, and the like which will be described later. The SIG 530 may include control information for decoding the PPDU.

The PPDU of FIG. 5 may include a data field 540.

The data field 540 may include a SERVICE field 541, a physical layer service data unit (PSDU) 542, a PPDU TAIL bit 543, and a padding bit 544. Some bits of the SERVICE field 541 may be used for synchronization of a descrambler at a receiving end. The PSDU 542 corresponds to a MAC protocol data unit (MPDU) defined in the MAC layer and may include data generated/used in a higher layer. The PPDU tail bit 543 may be used to return an encoder to a state of 0. The padding bit 544 may be used to adjust a length of the data field to a predetermined unit.

Figure 6:
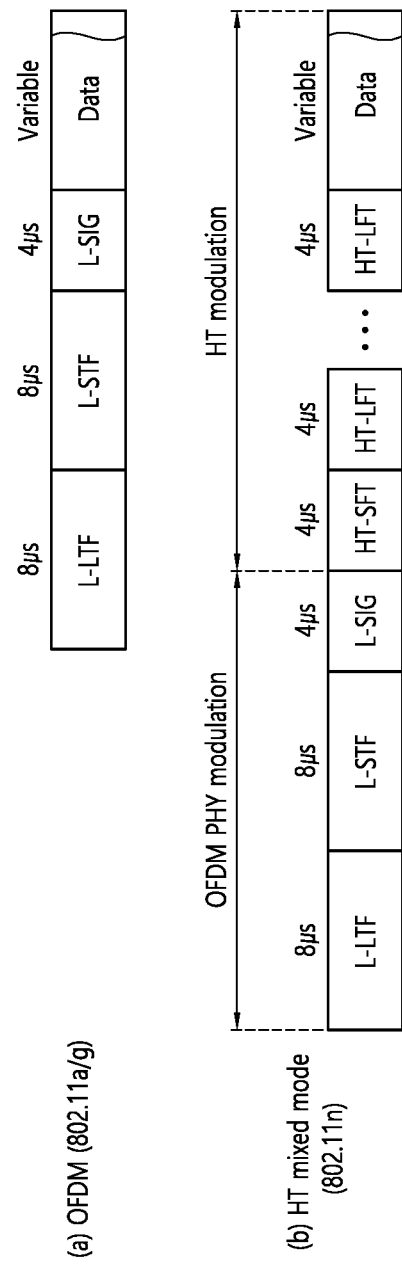
FIG. 6 illustrates an example of a PPDU according to the legacy WLAN standard.

FIG. 6 illustrates an example of a PPDU according to the legacy WLAN standard.

A PPDU illustrated in sub-drawing (a) of FIG. 6 is an example of a PPDU used in the IEEE 802.11a/g standard.

A PPDU illustrated in sub-drawing (b) of FIG. 6 is an example of a PPDU used in the IEEE 802.11n standard.

Figure 7:
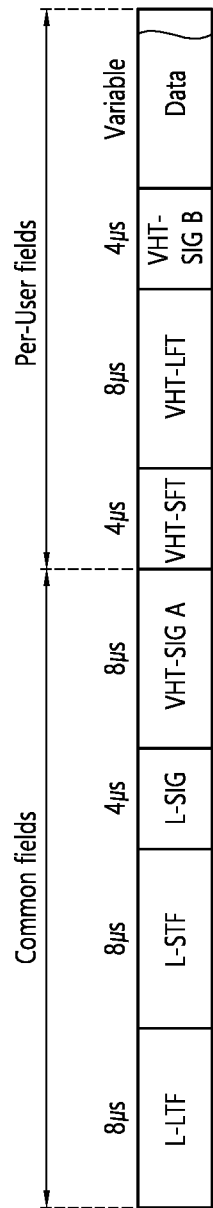
FIG. 7 illustrates another example of a PPDU according to the legacy WLAN standard.

FIG. 7 illustrates another example of a PPDU according to the legacy WLAN standard.

FIG. 7 shows an example of a PPDU according to the IEEE 802.11ac standard. Illustrated common fields include the legacy L-STF, L-LTF, and L-SIG, and also include a VHT-SIG A field newly proposed in the IEEE 802.11ac standard. The PPDU of FIG. 7 may be used both in single user (SU) communication in which a signal is transmitted from an AP to one user STA and in multi-user (MU) communication in which signals are transmitted from an AP to a plurality of user STAs. When MU communication is performed, the VHT-SIG A field includes common control information commonly applied to all receiving STAs.

Per-User fields illustrated in FIG. 7 include fields transmitted for at least one user STA when MU communication is performed. A VHT-STF field is an STF field newly proposed in the VHT standard (i.e., IEEE 802.11ac), and a VHT-LTF field is an LTF field newly proposed in the VHT standard. A VHT-SIG B field includes information for decoding a data field and may be individually configured for each receiving STA.

The PPDU of FIG. 7 may be transmitted to a plurality of STAs based on a multi-user multiple input, multiple output (MU-MIMO) technique. In addition, the PPDU may be transmitted to one STA based on the SU-MIMO technique.

Figure 8:
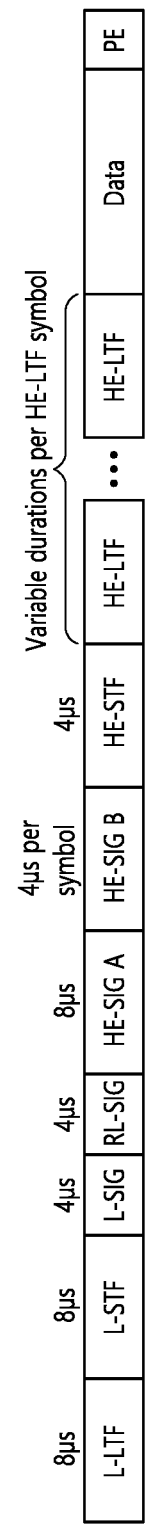
FIG. 8 illustrates another example of an HE-PPDU.

FIG. 8 illustrates another example of an HE-PPDU.

The example of FIG. 8 may be applied to an IEEE 802.11ax or high efficiency (HE) WLAN system. There are four types of PPDU formats according to the IEEE 802.11ax, and an example of FIG. 8 is an example of MU-PPDU used in MU communication. However, some of the technical features applied to the field illustrated in FIG. 8 may be used as it is in SU communication or UL-MU communication.

The technical features of the HE-PPDU illustrated in FIG. 8 may also be applied to a newly proposed EHT-PPDU. For example, technical features applied to an HE-SIG may also be applied to an EHT-SIG, and technical features applied to an HE-STF/LTF may also be applied to an EHT-SFT/LTF.

An L-STF of FIG. 8 may include a short training orthogonal frequency division multiplexing (OFDM) symbol. The L-STF may be used for frame detection, automatic gain control (AGC), diversity detection, and coarse frequency/time synchronization.

The L-LTF of FIG. 8 may include a long training orthogonal frequency division multiplexing (OFDM) symbol. The L-LTF may be used for fine frequency/time synchronization and channel prediction.

An L-SIG of FIG. 8 may be used to transmit control information. The L-SIG may include information on a data rate and data length. In addition, the L-SIG may be repeatedly transmitted. That is, the L-SIG may be configured in a format in which L-SIG is repeated (e.g., it may be referred to as RL-SIG).

An HE-SIG A of FIG. 8 may include control information common to receiving STAs.

Specifically, the HE-SIG A may include 1) a DL/UL indicator, 2) a BSS color field which is an identifier of a BSS, 3) a field indicating a remaining time of a current TXOP section, 4) a bandwidth field indicating 20, 40, 80, 160, 80+80 MHz, 5) a field indicating an MCS scheme applied to an HE-SIG B, 6) a field indicating whether the HE-SIG B is modulated according to a dual subcarrier modulation technique for MCS, 7) a field indicating the number of symbols used for the HE-SIG B, 8) a field indicating whether the HE-SIG B is generated over the entire band, 9) a field indicating the number of symbols of the HE-LTF, 10) a field indicating a length of the HE-LTF and a CP length, 11) a field indicating whether there is an additional OFDM symbol for LDPC coding, 12) a field indicating control information on packet extension (PE), and 13) a field indicating information on a CRC field of the HE-SIG A. These specific fields of the HE-SIG A may be added or some of them may be omitted. In addition, in environments other than an environment in which the HE-SIG A is a multi-user (MU), some fields may be added or omitted.

As described above, the HE-SIG B of FIG. 8 may be included only in the case of a PPDU for multiple users (MU). Basically, the HE-SIG A or the HE-SIG B may include resource allocation information (or virtual resource allocation information) for at least one receiving STA.

An HE-STF of FIG. 8 may be used to improve automatic gain control estimation in a multiple input multiple output (MIMO) environment or an OFDMA environment.

An HE-LTF of FIG. 8 may be used to estimate a channel in the MIMO environment or the OFDMA environment.

A size of fast Fourier transform (FFT)/inverse fast Fourier transform (IFFT) applied to the HE-STF and a field after the HE-STF of FIG. 8 may be different from a size of the FFT/IFFT applied to the field before the HE-STF. For example, the size of the FFT/IFFT applied to the HE-STF and the field after the HE-STF may be 4 times larger than the size of the FFT/IFFT applied to the field before the HE-STF.

For example, when at least one field among L-STF, L-LTF, L-SIG, HE-SIG A, and HE-SIG B on the PPDU of FIG. 8 is referred to as a first field/part, at least one of a data field, HE-STF, and HE-LTF may be referred to as a second field/part. The first field may include a field related to the legacy system, and the second field may include a field related to an HE system. In this case, the size of FFT/IFFT may be defined as N times the size of FFT/IFFT used in the legacy WLAN system (N is a natural number, e.g., N=1, 2, and 4). That is, FFT/IFFT having a size of N (=4) times may be applied to the second field of the HE PPDU, compared to the first field of the HE PPDU. For example, 256 FFT/IFFT may be applied for a bandwidth of 20 MHz, 512 FFT/IFFT may be applied for a bandwidth of 40 MHz, 1024 FFT/IFFT is applied for a bandwidth of 80 MHz, and 2048 FFT/IFFT may be applied for a continuous or discontinuous bandwidth of 160 MHz.

In other words, subcarrier spacing may have a size of 1/N times subcarrier spacing used in the legacy WLAN system (N is a natural number, for example, when N=4, 78.125 kHz). That is, subcarrier spacing having a size of 312.5 kHz which is legacy subcarrier spacing may be applied to the first field/part of the HE PPDU, and subcarrier spacing having a size of 78.125 kHz may be applied to the second field/part of the HE PPDU.

Alternatively, an IDFT/DFT period applied to each symbol of the first field may be expressed to be N (=4) times shorter than the IDFT/DFT period applied to each data symbol of the second field. That is, a length of IDFT/DFT applied to each symbol of the first field of the HE PPDU may be expressed as 3.2 μs, and a length of IDFT/DFT applied to each symbol of the second field of the HE PPDU may be expressed as 3.2 μs*4 (=12.8 μs). A length of an OFDM symbol may be a value obtained by adding a length of a guard interval (GI) to the length of the IDFT/DFT. The length of the GI may be various values such as 0.4 μs, 0.8 μs, 1.6 μs, 2.4 μs, and 3.2 μs.

As described above, the technical features in which subcarrier spacing of different sizes is applied to one PPDU may also be applied to the EHT-PPDU as it is. That is, subcarrier spacing having a size of 312.5 kHz may be applied to the first field/part of the EHT-PPDU, and subcarrier spacing having a size of 78.125 kHz may be applied to the second field/part of the EHT PPDU. The first field/part of the EHT-PPDU may include L-LTF, L-STF, L-SIG, EHT-SIG-A, and/or EHT-SIG-B. In addition, the second field/part of the EHT-PPDU may include EHT-STF, EHT-LTF, and/or a data field. The classification of the first part/second part of the EHT-PPDU may be changed.

Hereinafter, a resource unit (RU) used in the PPDU will be described. The RU may include a plurality of subcarriers (or tones). The RU may be used in the case of transmitting signals to multiple STAs based on the OFDMA technique. Also, the RU may be defined even when a signal is transmitted to one STA. The RU may be used for STF, LTF, data field, and the like.

Figure 9:
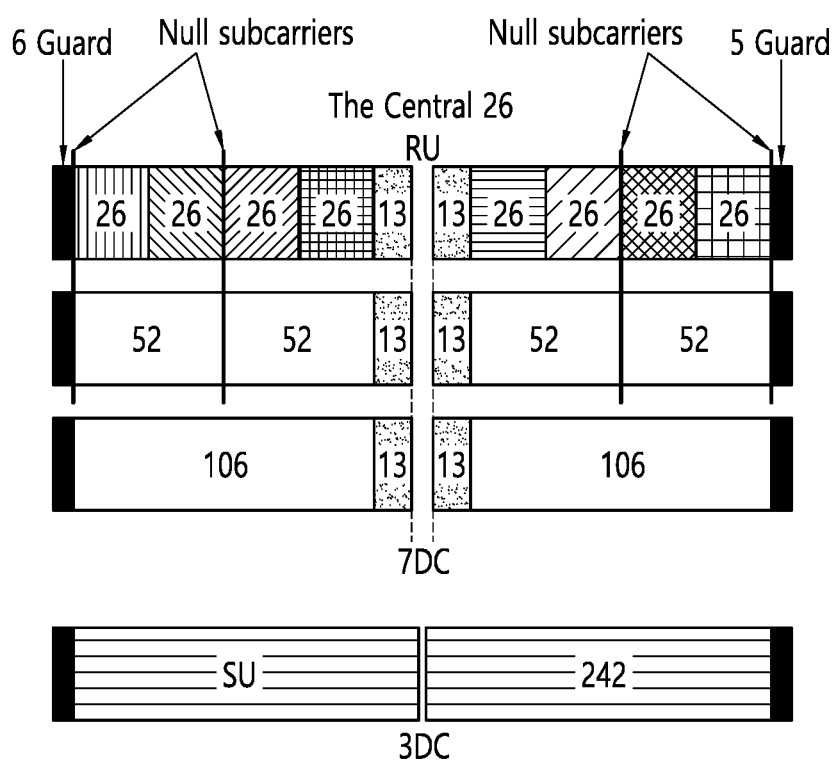
FIG. 9 illustrates a layout of resource units (RUs) used in a 20 MHz band.

FIG. 9 illustrates a layout of resource units (RUs) used in a band of 20 MHz.

As illustrated in FIG. 9, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 9, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 9 may be used not only for a multiple users (MUs) but also for a single user (SU), in which case one 242-unit may be used and three DC tones may be inserted as illustrated in the lowermost part of FIG. 9.

Although FIG. 9 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 10:
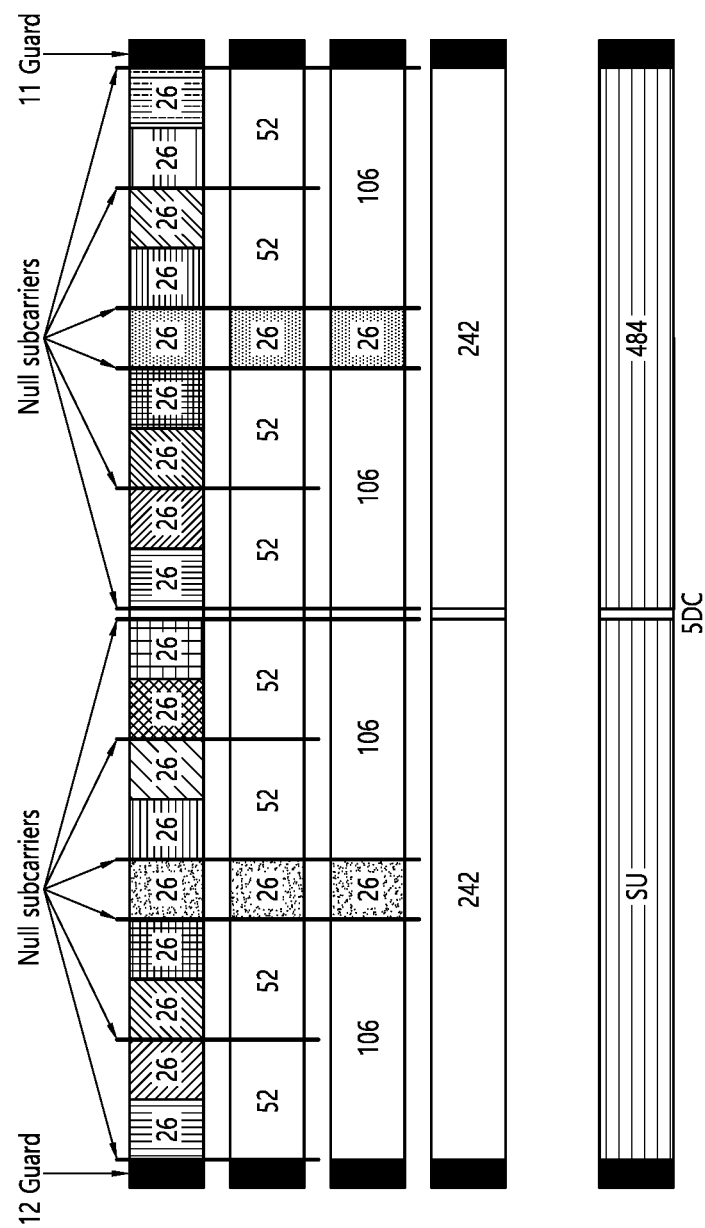
FIG. 10 illustrates a layout of RUs used in a 40 MHz band.

FIG. 10 illustrates a layout of RUs used in a band of 40 MHz.

Similarly to FIG. 9 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 10, when the layout of the RUs is used for a single user, a 484-RU may be used. The specific number of RUs may be changed similarly to FIG. 9.

Figure 11:
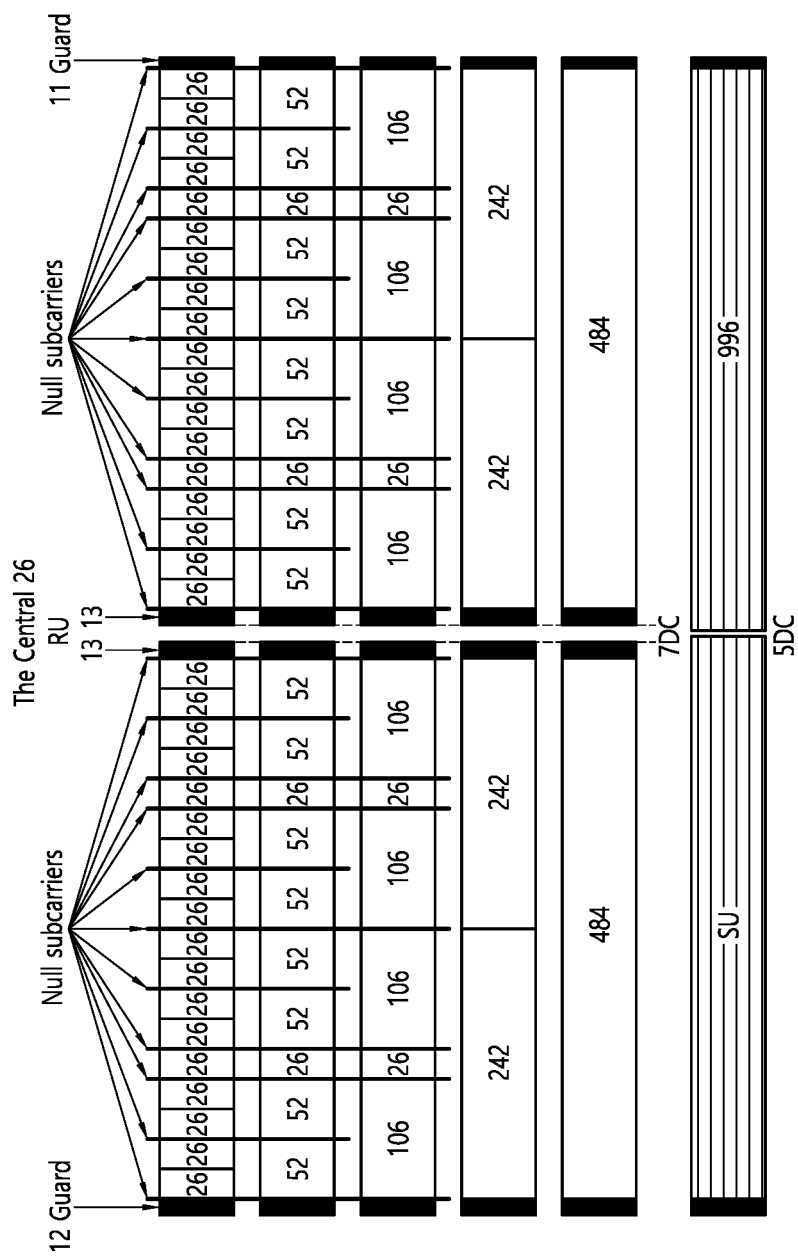
FIG. 11 illustrates a layout of RUs used in an 80 MHz band.

FIG. 11 illustrates a layout of RUs used in a band of 80 MHz.

Similarly to FIG. 9 and FIG. 10 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the RUs is used for a single user, a 996-RU may be used, in which case five DC tones may be inserted.

The specific number of RUs may be changed similarly to FIG. 9 and FIG. 10.

The RUs illustrated in FIGS. 9 to 11 may be used for OFDMA-based communication. That is, any one RU (26/52/106/242-RU, etc.) illustrated in FIGS. 9 to 11 may be allocated to one STA, and the other RU may be allocated to another STA. That is, MU communication may be performed by allocating the RUs illustrated in FIGS. 9 to 11 to a plurality of STAs. MU communication may be applied to downlink communication as well as to uplink communication.

For DL MU communication, the MU PPDU illustrated in FIG. 8 may be used. That is, DL-MU communication may be performed through OFDMA and/or MU-MIMO scheme based on the PPDU of FIG. 8.

In addition, UL MU communication is also supported in the WLAN system. A trigger frame is defined for UL MU communication. The trigger frame may include ID information on a plurality of STAs participating in UL MU communication and radio resources (e.g., RU information) used in UL MU communication.

Figure 12:
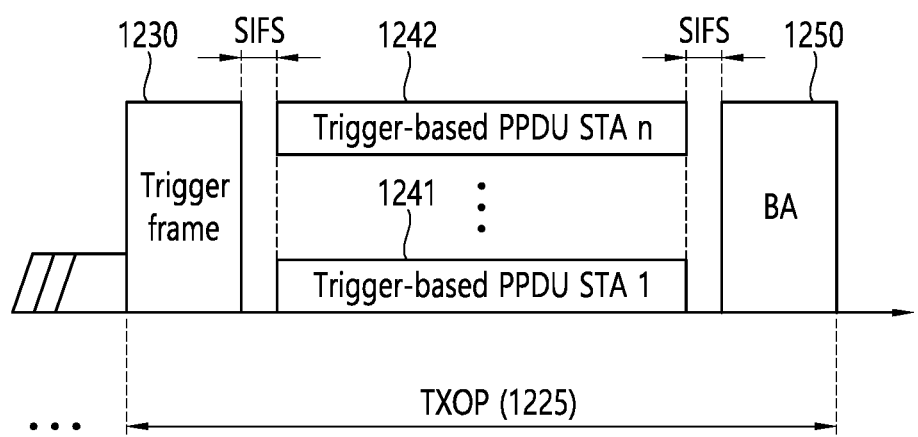
FIG. 12 illustrates an example of UL MU communication.

FIG. 12 illustrates an example of UL MU communication.

According to the example of FIG. 12, the AP transmits a trigger frame 1230. The trigger frame may be defined in the form of a MAC frame and may be included in a PPDU of various formats and transmitted from the AP. That is, when a PPDU including the trigger frame 1230 is received by the STA, UL MU communication starts after a short interframe space (SIFS) period. Specifically, a plurality of STAs (i.e., STA 1 to STA n) indicated by the trigger frame 1230 perform UL-MU communication based on an uplink resource (i.e., RU) indicated by the trigger frame 1230. Specifically, the plurality of STAs (i.e., STA 1 to STA n) transmits a trigger-based (TB) PPDU according to the IEEE 802.11ax standard to the AP. A plurality of TB PPDUs transmitted by the plurality of STAs is transmitted in the same time period, and information on the same time period may be included in the trigger frame 1230. Thereafter, the AP may transmit an ACK/NACK signal for TB PPDUs 1241 and 1242 through a block ACK (BA). UL MU communication may be performed within a TXOP 1225 period acquired by the AP.

Figure 13:
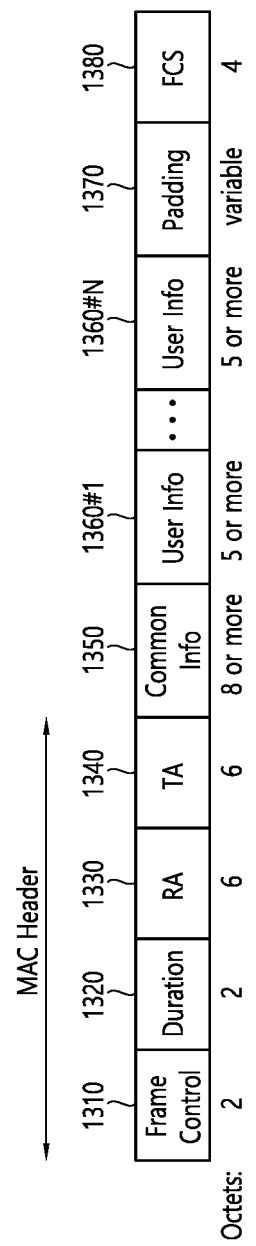
FIG. 13 illustrates an example of a trigger frame.

FIG. 13 illustrates an example of a trigger frame. The trigger frame of FIG. 13 may allocate resources for uplink multi-user transmission (MU) and may be transmitted from the AP. The trigger frame may include a MAC frame and may be included in a PPDU.

Some of the fields illustrated in FIG. 13 may be omitted and other fields may be added. Also, a length of each field may be changed to be different from that shown.

A frame control field 1310 of FIG. 13 may include information on a version of a MAC protocol and other additional control information, and a duration field 1320 may include time information for setting up a network allocation vector (NAV) described below or information on an identifier (e.g., AID) of the terminal.

In addition, an RA field 1330 may include address information of a receiving STA of the corresponding trigger frame and may be omitted as necessary. A TA field 1340 includes address information of an STA (e.g., AP) that transmits the corresponding trigger frame, and a common information field 1350 includes common control information applied to the receiving STA that receives the corresponding trigger frame.

Figure 14:
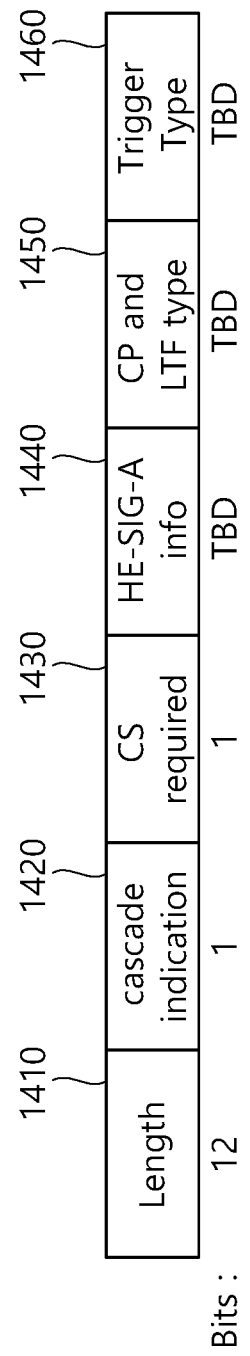
FIG. 14 illustrates an example of a common information field.

FIG. 14 illustrates an example of a common information field. Some of the subfields of FIG. 10 may be omitted and other subfields may be added. In addition, a length of each of the illustrated subfields may be changed.

An illustrated length field 1410 has the same value as a length field of an L-SIG field of an uplink PPDU transmitted in response to a corresponding trigger frame, and the length field of the L-SIG field of the uplink PPDU represents a length of the uplink PPDU. As a result, the length field 1410 of the trigger frame may be used to indicate the length of the corresponding uplink PPDU.

In addition, a cascade indication field 1420 indicates whether a cascade operation is performed. The cascade operation means that downlink MU transmission and uplink MU transmission are performed together in the same TXOP. That is, it means that, after downlink MU transmission is performed, uplink MU transmission is performed after a preset time (e.g., SIFS). During the cascade operation, only one transmitting device (e.g., AP) that performs downlink communication may exist and a plurality of transmitting devices (e.g., non-APs) that perform uplink communication may exist.

A CS required field 1430 indicates whether to consider a state of a wireless medium or a network allocation vector (NAV) in a situation in which a receiving device receiving the corresponding trigger frame transmits a corresponding uplink PPDU.

An HE-SIG-A information field 1440 includes information for controlling content of an SIG-A field (i.e., HE-SIG A field) of the uplink PPDU transmitted in response to the corresponding trigger frame.

A CP and LTF type field 1450 may include information on a length of an LTF and a length of a CP of the uplink PPDU transmitted in response to the corresponding trigger frame. A trigger type field 1460 may indicate a purpose for using the corresponding trigger frame, for example, normal triggering, triggering for beamforming, a request for block ACK/NACK, and the like.

Meanwhile, a remaining description of FIG. 13 is added as follows.

It is preferred to include per user information fields 1360 #1 to 1360 #N) corresponding to the number of receiving STAs that receive the trigger frame of FIG. 13. The per user information fields may be referred to as "RU allocation fields".

In addition, the trigger frame of FIG. 13 may include a padding field 1370 and a frame check sequence field 1380.

It is preferred that each of the per user information fields 1360 #1 to 1360 #N illustrated in FIG. 13 includes a plurality of subfields.

Figure 15:
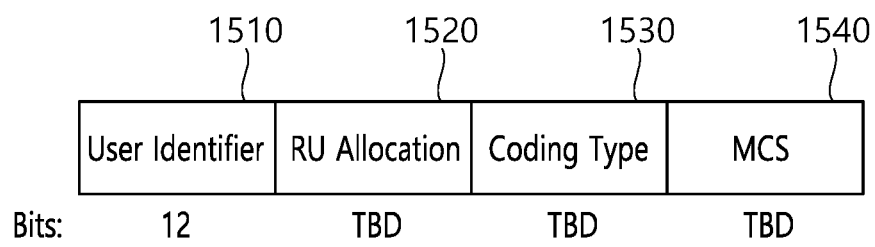
FIG. 15 illustrates an example of a subfield included in a per user information field.

FIG. 15 illustrates an example of subfields included in the per user information field. Some of the subfields of FIG. 15 may be omitted and other subfields may be added. In addition, a length of each of the illustrated subfields may be changed.

A user identifier field 1510 of FIG. 15 indicates an identifier of an STA (i.e., a receiving STA) to which per user information corresponds, and an example of the identifier may be the entirety of a portion of an AID.

In addition, an RU Allocation field 1520 may be included. That is, when the receiving STA identified by the user identifier field 1510 transmits an uplink PPDU in response to the trigger frame of FIG. 9, the receiving STA transmits the corresponding uplink PPDU through an RU indicated by the RU allocation field 1520. In this case, it is preferable that the RU indicated by the RU allocation field 1520 indicates the RUs illustrated in FIGS. 9, 10, and 11.

The subfields of FIG. 15 may include a coding type field 1530. The coding type field 1530 may indicate a coding type of an uplink PPDU transmitted in response to the trigger frame of FIG. 13. For example, when BCC coding is applied to the uplink PPDU, the coding type field 1530 may be set to '1', and when LDPC coding is applied, the coding type field 1530 may be set to '0'.

Further, the subfields of FIG. 15 may include an MCS field 1540. The MCS field 1540 may indicate an MCS scheme applied to the uplink PPDU transmitted in response to the trigger frame of FIG. 13.

Meanwhile, the STA may transmit various feedback schedules (e.g., buffer status report or information on a channel status) based on UL OFDMA random access (UORA) defined according to the IEEE 802.11ax standard.

Figure 16:
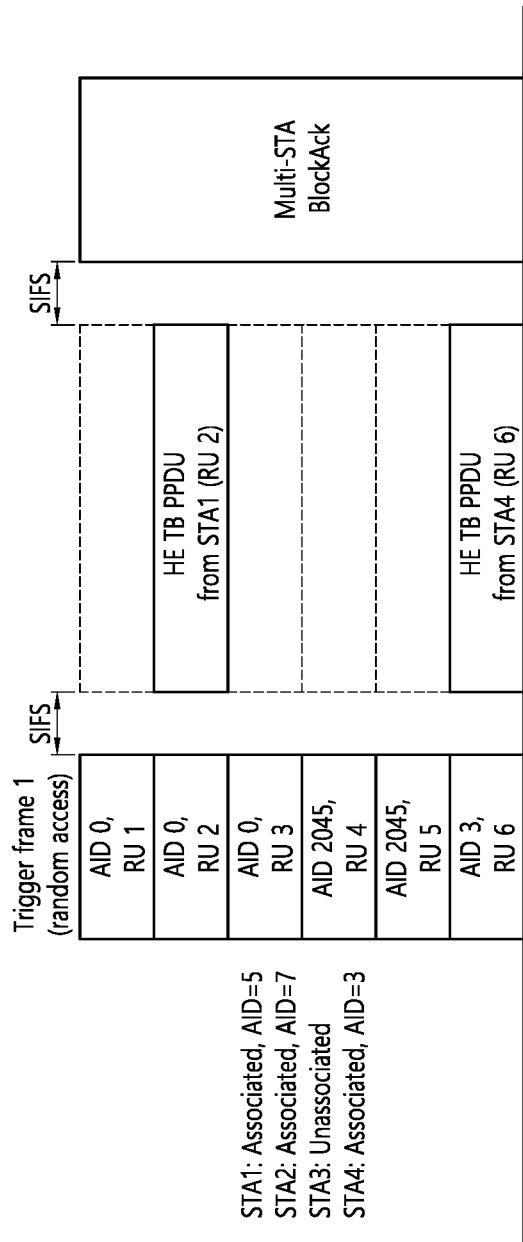
FIG. 16 illustrates a method of performing UORA in a WLAN system.

FIG. 16 illustrates a method of performing UORA in a WLAN system.

As illustrated, the AP may allocate six RU resources as illustrated in FIG. 16 through a trigger frame (e.g., FIGS. 13 to 15). Specifically, the AP may allocate a first RU resource (AID 0, RU 1), a second RU resource (AID 0, RU 2), a third RU resource (AID 0, RU 3), a fourth RU resource (AID 2045, RU 4), a fifth RU resource (AID 2045, RU 5), and a sixth RU resource (AID 2045, RU 6). Information on AID 0 or AID 2045 may be included, for example, in the user identification field 1510 of FIG. 15. Information on RU 1 to RU 6 may be included, for example, in the RU allocation field 1520 of FIG. 15. AID=0 may refer to a UORA resource for an associated STA, and AID=2045 may refer to a UORA resource for an unassociated STA. Accordingly, the first to third RU resources of FIG. 16 may be used as UORA resources for the associated STA, the fourth and fifth RU resources of FIG. 16 may be used for the unassociated STA, and the sixth RU resource of FIG. 16 may be used as a resource for a normal UL MU.

In the example of FIG. 16, an OFDMA random access BackOff (OBO) counter of STA1 is reduced to 0, so that STA1 randomly selects the second RU resource (AID 0, RU 2). In addition, since an OBO counter of STA2/3 is greater than 0, uplink resources are not allocated to STA2/3. In addition, since an AID (i.e., AID=3) of the STA4 is included in the trigger frame in FIG. 16, the resource of RU 6 is allocated to the STA4 without backoff.

Specifically, since STA1 of FIG. 16 is an associated STA, there are a total of three eligible RA RUs (RU 1, RU 2, and RU 3) for STA1, and accordingly, STA1 decreases the OBO counter by 3, and thus the OBO counter is zero. In addition, since STA2 of FIG. 16 is an associated STA, there are a total of 3 eligible RA RUs (RU 1, RU 2, and RU 3) for STA2, and accordingly, STA2 decreases the OBO counter by 3, but the OBO counter is greater than 0. In addition, since STA3 of FIG. 16 is an unassociated STA, there are a total of two eligible RA RUs (RU 4 and RU 5) for STA3, and accordingly, STA3 decreases the OBO counter by 2, but the OBO counter is greater than 0.

Figure 17:
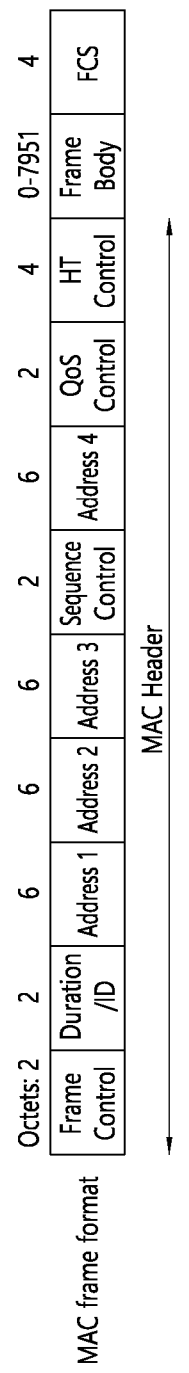
FIG. 17 illustrates an example of a MAC frame.

FIG. 17 illustrates an example of a MAC frame.

The MAC frame of FIG. 17 may be included in a physical layer service data unit (PSDU) included in the data field of the PPDU. A length of each field illustrated in FIG. 17 may be changed, and some of the fields may be omitted. As shown, the MAC frame may include a MAC header.

The data field may include a service field, a physical layer service data unit (PSDU), and a PPDU tail bit, and may optionally include a padding bit. Some bits of the service field may be used for synchronization of a descrambler at a receiving end. The PSDU may correspond to a MAC protocol data unit (MPDU) defined in a MAC layer and may include data generated/used in a higher layer. The PPDU tail bit may be used to return an encoder to a zero state. The padding bit may be used to adjust the length of the data field in a specific unit.

The MPDU is defined according to various MAC frame formats, and a basic MAC frame includes a MAC header, a frame body, and a frame check sequence (FCS). The MAC frame may include an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a subtype, whether it is transmitted during a contention free period (CFP), QoS capability of a transmitting STA, or the like. In a control frame of which a subtype is PS-poll, the duration/ID field may include an AID of a transmitting STA (e.g., through 14 LSBs), and two MSBs may be set to 1. (ii) In frames transmitted by a point coordinator (PC) or a non-QoS STA during a CFP, the duration/ID field may be set to a fixed value (e.g., 32768). (iii) In other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, the duration/ID field is used to indicate a TXOP duration, and B0 to B14 may be used to indicate an actual TXOP duration. The actual TXOP duration indicated by B0 to B14 may be any one of 0 to 32767, and a unit thereof may be a microsecond (us). However, if the duration/ID field indicates a fixed TXOP duration value (e.g., 32768), B15=1 and B0 to B14=0. If set to B14=1 and B15=1, the duration/ID field is used to indicate an AID, and B0 to B13 indicate one AID ranging from 1 to 2007.

A frame control field of the MAC header may include Protocol Version, Type, Subtype, To DS, From DS, More Fragment, Retry, Power Management, More Data, Protected Frame, and Order subfields.

In the conventional 11ax, a tone plan for full band and OFDMA transmission is designed at 20/40/80/80+80/160 MHz, and a 160 MHz tone plan is used by simply repeating the existing 80 MHz tone plan two times. This is designed by considering a case of performing transmission based on two RFs. And, therefore, this may be an appropriate tone plan for a case of non-contiguous 80+80 MHz. However, in a case of contiguous 160 MHz, a situation where transmission is performed by using one RF may be considered. And, in this case, since a large number of subcarriers are wasted in the existing (or conventional) tone plan, a new tone plan for increasing efficiency and throughput of the subcarriers that are being used may be proposed.

1. New 160 MHz Tone Plan

<Full Band>

In case of performing transmission by using a full band, a new RU may be proposed, and a size of the new RU may be determined by considering various DCs in accordance with an influence of a DC offset and by considering a 160 MHz Guard tone of the conventional 11ax. The existing 11ax guard tones are left 12 and right 11, and the number of DCs of 80 MHz is equal to 5 or 7. Based on this structure, the new RU of a full band is 2020RU or 2018RU.

12/11 guard tone, 5DC, 2020RU

12/11 guard tone, 7DC, 2018RU

Considering the influence of the DC offset at 1601 MHz, it is not preferable to use less than 5/7 DCs, which is the number(s) of DCs used at 80 MHz, and 5/7 DCs may be sufficient in light of performance (or capability). Considering the following OFDMA tone plan, a maximum of 7 DCs may be appropriate. The DCs in the OFDMA tone plan shown below are designed based on 7DC and 5DC in the existing 80 MHz OFDMA tone plan. And, it is not preferable to use DCs that are less than 5 DCs, and, in light of performance, 5/7 DCs may be sufficient. 7DC is used at 20 MHz and 80 MHz, wherein central 26RU (13+13 RUs) is used in the existing 11ax.

<OFDMA Tone Plan>

The OFDMA tone plan may be expressed by using the existing 996RU and 26RU (13+13 RUs) as shown below. In the following structure, G denotes guard tone, and N denotes null tone.

12G+996RU+13RU+7DC+13RU+996RU+11G

12G+996RU+1N+13RU+5DC+13RU+1N+996RU+11G

In the structures presented above, the number of DCs and the number of null subcarriers on both sides may be configured by the performance of the central 26RU (13+13 RUs) according to the influence of the DC offset and interference. Considering the influence of interference, 5 DCs and 1 null carrier on both sides may be an advantageous structure.

Two types of configurations of 996RU may be proposed as follows.

$$996RU=484RU+1N+26RU+1N+484RU\ 996RU=1N+484RU+26RU+484RU+1N$$

The first structure is configured to reduce the influence of the interference from/to an adjacent RU by putting a null tone on both sides of the 26RU, and the second structure is configured to reduce the influence of the interference between 484RU and its adjacent RU. Since a RU using a small number of subcarriers, such as 26RU, causes significant influence on performance, it may be preferable to use the first structure.

The 484RU has a structure of two 242RUs as in the existing 11ax.

$$484RU=242RU+242RU$$

The 242RU has the following structure as in the existing 11ax.

$$242RU=1N+106RU+1N+26RU+1N+106RU+1N$$

The 106RU has the following structure as in the existing 11ax.

$$106RU=52RU+2N+52RU$$

The 52RU has the following structure as in the existing 11ax.

$$52RU=26RU+26RU$$

2. 320 MHz Tone Plan

The configuration of 320 MHz may consider various options as follows.

Option 1: Combination of Four Existing 11Ax 80 MHz Tone Plans

This combination takes into account both contiguous and non-contiguous situations and may be expressed as shown below.

80+80+80+80 MHz/160+80+80 MHz/80+160+80 MHz/ 80+80+160 MHz/240+80 MHz/80+240 MHz/320 MHz

+ means a non-contiguous situation, and 160/240/320 means that 2/3/4 of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost 80 MHz tone plan is tone index+1024 of the existing 80 MHz tone plan.

In case 320 MHz is used, a tone index of a first 80 MHz tone plan starting from the left is tone index −1536 of the existing 80 MHz tone plan, and a tone index of a second 80 MHz tone plan is tone index −512 of the existing 80 MHz tone plan, and a tone index of a third 80 MHz tone plan is tone index+512 of the existing 80 MHz tone plan, and a tone index of a fourth 80 MHz tone plan is tone index+1536 of the existing 80 MHz tone plan.

The various non-contiguous combinations presented above may also use different bands as well as the same band. For example, at 80+160+80 MHz, each 80/160/80 MHz bandwidth may be transmitted by using the 2.4 GHz/5 GHz/6 GHz band.

Option 2: Combination of Two New 160 MHz Tone Plans

This combination takes into account both contiguous and non-contiguous situations and may be expressed as shown below.

160+160 MHz/320 MHz

+ means a non-contiguous situation, and 320 MHz means that two new 160 MHz tone plans are contiguously aligned.

<In Case there is a Contiguous Band>

In case 320 MHz is used, a tone index of the 160 MHz tone plan on the left side is tone index −1024 of a new 160 MHz tone plan, and a tone index of the 160 MHz tone plan on the right side is tone index+1024 of a new 160 MHz tone plan.

The non-contiguous combination presented above may also use different bands as well as the same band. For example, at 160+160 MHz, each 160 MHz bandwidth may be transmitted by using the 2.4 GHz/5 GHz band.

Option 3: Combination of Two Existing 11Ax 80 MHz Tone Plans and One New 160 MHz Tone Plan This combination takes into account both contiguous and non-contiguous situations and may be expressed as shown below.

c80+c80+n160 MHz/c80+n160 MHz+c80/n160+c80+c80 MHz/cc160+n160 MHz/n160+cc160 MHz/ncc320 MHz/cnc320 MHz/ccn320 MHz + means a non-contiguous situation, and each of c80 MHz, cc160 MHz, and n160 MHz means the existing 11ax 80 MHz tone plan, two contiguous existing 11ax 80 MHz tone plans, and a new 160 MHz tone plan, respectively. ncc320 MHz/cnc320 MHz/ccn320 MHz means a contiguous alignment of a new 160 MHz tone plan and two existing 11ax 80 MHz tone plans. And, ncc/cnc/ccn indicates a contiguous (or sequential) order of each tone plan.

<In Case there is a Contiguous Band>

In case cc160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case ncc320 MHz is used, a tone index of the 160 MHz tone plan on the left side is tone index −1024 of the new 160 MHz tone plan, a tone index of the next 80 MHz tone plan is tone index+512 of the existing 80 MHz tone plan, and a tone index of the last 80 MHz tone plan is tone index+1536 of the existing 80 MHz tone plan.

In case cnc320 MHz is used, a tone index of the 80 MHz tone plan on the left side is tone index −1536 of the existing 80 MHz tone plan, a tone index of the 160 MHz tone plan in the middle is the same tone index of the new 160 MHz tone plan, and a tone index of the last 80 MHz tone plan is tone index+1536 of the existing 80 MHz tone.

In case ccn320 MHz is used, a tone index of the 80 MHz tone plan on the left side is tone index −1536 of the existing 80 MHz tone plan, a tone index of the next 80 MHz tone plan is the tone index −512 of the existing 80 MHz tone plan, and a tone index of the last 160 MHz tone plan is tone index+1024 of the new 160 MHz tone plan.

In the option presented above, various combinations of tone plans having different structures of c80 and n160 may be considered. In this case, there lies a disadvantage in that an indication related to RU allocation may become very complicated. Therefore, in order to reduce signaling overhead, the combinations may be limited to using only structures having specific orders. For example, only c80+c80+n160 MHz/ccn320 MHz may be used.

The various non-contiguous combinations presented above may also use different bands as well as the same band. For example, at c80+n160+c80 MHz, each c80/n160/c80 MHz bandwidth may be transmitted by using the 2.4 GHz/5 GHz/6 GHz band.

Option 4: Alternative 320 MHz Tone Plan Considering the Usage of One RF

In the case of contiguous 320 MHz, a situation where transmission is performed by using one RF may be considered. And, in this case, since 320 MHz, which is configured of a combination of 160 MHz or 80 MHz tone plans, has a large number of wasted subcarriers, a new tone plan may be proposed in order to increase efficiency and throughput of the subcarriers that are used. Various alternative tone plans will be proposed as follows.

A. Alternative 320 MHz Tone Plan 1

In case of configuring 320 MHz with two contiguous 160 MHz tone plans, 12 left/11 right guard tones are used, and these may be directly applied to the alternative 320 MHz tone plan without modification. Additionally, in case of performing transmission by using a full band, a new RU may be proposed, and various DCs may be considered according to the influence of the DC offset, and a size of the new RU may be determined by considering the guard tone size. The number of DCs of 80 MHz of the existing 11ax is equal to 5 or 7. And, considering this, the new RU of the full band is 4068RU or 4066RU.

12/11 guard tone, 5DC, 4068RU (RU subcarrier index is −2036:−3, 3:2036)

12/11 guard tone, 7DC, 4066RU (RU subcarrier index is −2036:−4, 4:2036)

Considering the effects of DC offset at 320 MHz, it is not preferable to use less than 5/7 DCs, which is the number of DCs used at 80 MHz, and 5/7 DCs may be sufficient in light of performance (or capability). Considering the OFDMA tone plan used in 2020RU, which is presented below, a maximum of 7 DCs may be appropriate. Since the number of DCs in the OFDMA tone plan is designed based on the 7 DCs used in the existing 11ax 80 MHz OFDMA tone plan, it is not preferable to use a number of DCs that is smaller than 7, and, in light of performance, 7 DCs may also be sufficient at 320 MHz.

The OFDMA tone plan may be expressed by using the existing 2020RU and 26RU (13+13 RUs) as shown below.

12G+2020RU+13RU+7DC+13RU+2020RU+11G

Two types of configurations of 2020RU may be proposed as follows.

$$2020RU = 996RU + 1N + 26RU + 1N + 996RU$$

$$2020RU = 1N + 996RU + 26RU + 996RU + 1N$$

The first structure is configured to reduce the influence of the interference from/to an adjacent RU by putting a null tone on both sides of the 26RU, and the second structure is configured to reduce the influence of the interference between 996RU and its adjacent RU. Since a RU using a small number of subcarriers, such as 26RU, causes significant influence on performance, it may be preferable to use the first structure.

Two types of configurations of 996RU may be proposed as in the new 160 MHz.

996RU=484RU+1N+26RU+1N+484RU

996RU=1N+484RU+26RU+484RU+1N

The 484RU has a structure of two 242RUs as in the existing 11ax.

484RU=242RU+242RU

The 242RU has the following structure as in the existing 11ax.

242RU=1N+106RU+1N+26RU+1N+106RU+1N

The 106RU has the following structure as in the existing 11ax.

106RU=52RU+2N+52RU

The 52RU has the following structure as in the existing 11ax.

52RU=26RU+26RU 3. 240 MHz

An AP may transmit a PPDU by using a bandwidth of 240 MHz, and 240 MHz may be configured by combining three existing 11ax 80 MHz tone plans. This combination takes into account both contiguous and non-contiguous situations and may be expressed as follows. 80+80+80 MHz/160+80 MHz/80+160 MHz/240 MHz + means a non-contiguous situation, and 160/240 means that ⅔ of 80 MHz tone plans are contiguously aligned in succession.

<In Case there is a Contiguous Band>

In case 160 MHz is used, a tone index of the 80 MHz tone plan on the left side is tone index −512 of the existing 80 MHz tone plan, and a tone index of the 80 MHz tone plan on the right side is tone index+512 of the existing 80 MHz tone plan.

In case 240 MHz is used, a tone index of the 80 MHz tone plan in the middle is the same as the tone index of the existing 80 MHz tone plan, and a tone index of the leftmost 80 MHz tone plan is tone index −1024 of the existing 80 MHz tone plan, and a tone index of the rightmost 80 MHz tone plan is tone index+1024 of the existing 80 MHz tone plan.

A pilot subcarrier shall also be calibrated according to its position. And, in case 160 MHz is used, a pilot tone index of the 80 MHz tone plan on the left side is pilot tone index −512 of the existing 80 MHz tone plan, and a pilot tone index of the 80 MHz tone plan on the right side is pilot tone index+512 of the existing 80 MHz tone plan.

In case 240 MHz is used, a pilot tone index of the 80 MHz tone plan in the middle is the same as the pilot tone index of the existing 80 MHz tone plan, and a pilot tone index of the leftmost 80 MHz tone plan is pilot tone index −1024 of the existing 80 MHz tone plan, and a pilot tone index of the rightmost 80 MHz tone plan is pilot tone index+1024 of the existing 80 MHz tone plan.

Alternatively, the existing 11ax 80 MHz tone plan and the new 160 MHz tone plan may be used, and both contiguous and non-contiguous situations may be considered and expressed as follows.

c80+n160 MHz/n160 MHz+c80/nc240 MHz/cn240 MHz

+ means a non-contiguous situation, and each of c80 MHz and n160 MHz means the existing 11ax 80 MHz tone plan and a new 160 MHz tone plan, respectively. nc240 MHz/cn240 MHz means a contiguous alignment of the new 160 MHz tone plan and the existing 11ax 80 MHz tone plan. And, nc/cn indicates a contiguous (or sequential) order of each tone plan.

In case nc240 MHz is used, a tone index of the 160 MHz tone plan on the left side is tone index −512 of the new 160 MHz tone plan, and a tone index of 80 MHz on the right side is tone index+1024 of the existing 80 MHz tone plan.

In case cn240 MHz is used, a tone index of the 80 MHz tone plan on the left side is tone index −1024 of the existing 80 MHz tone plan, and a tone index of 160 MHz on the right side is tone index+512 of the new 160 MHz tone plan.

A pilot subcarrier shall also be calibrated according to its position. And, in case nc240 MHz is used, a pilot tone index of the 160 MHz tone plan on the left side is pilot tone index −512 of the new 160 MHz tone plan, and a pilot tone index of 80 MHz on the right side is pilot tone index+1024 of the existing 80 MHz tone plan.

In case cn240 MHz is used, a pilot tone index of the 80 MHz tone plan on the left side is pilot tone index −1024 of the existing 80 MHz tone plan, and a pilot tone index of 160 MHz on the right side is pilot tone index+512 of the new 160 MHz tone plan.

The various non-contiguous combinations presented above may also use different bands as well as the same band. For example, at 80+80+80 MHz, each 80 MHz bandwidth may be transmitted by using the 2.4 GHz/5 GHz/6 GHz band.

More specifically, a tone plan of 240 MHz may be configured by broadly using 3 different methods.

Option 1: Combination of Three 80 MHz Tone Plans (80+80+80)

Option 2: combination of two 80 MHz tone plans and one new 160 MHz tone plan (160+80/80+160)

Option 3: Alternative 240 MHz Tone Plan (240)

A non-contiguous situation may also be a case where different bands are used. An index of a RU subcarrier may be calibrated according to its position.

An index of a 240 MHz pilot subcarrier may be calibrated according to its position as follows.

160 MHz: existing 80 MHz±512 (RU tone index also the same)

240 MHz: existing 80 MHz±1024, existing 80 MHz (RU tone index also the same), new 160 MHz±512 (RU tone index also the same)

Tone plan 1

In case of using a full band, a new RU may be proposed by considering the guard tones and DC tones. The existing 11ax 80 MHz and 160 MHz use 12 right and 11 left guard tones, and these guard tones are also used in 240 MHz without modification. When considering actual interference from an adjacent channel or interference to an adjacent channel, the usage of these guard tones shall not cause any significant problem. Additionally, a number of DCs equal to or greater than the number of DCs used in the existing 80 MHz, which is 5 or 7 DCs, shall be used. However, when considering the DC offset, the usage of 5 or 7 DCs shall not cause any significant problem. Considering this, a tone plan may be proposed as presented below. In the following, G denotes guard tone, and N denotes null tone.

1. Alternative 240 MHz Tone Plan 1

<Full Band Tone Plan>

12/11 guard, DC 5 or 7, RU 3044 or 3042

<OFMDA Tone Plan>

12G+996RU+1N+26RU+1N+996RU (5DC)+1N+26RU+1N+996RU+11G

996RU on both sides=484RU+1N+26RU+1N+484RU
(ver1) (or 1N+484RU+26RU+484RU+1N
(ver2))

996RU (5DC) in the middle=484RU+13RU+7DC+
13RU+484RU (the same as existing 80 MHz)

484RU=242RU+242RU

242RU=1N+106RU+1N+26RU+1N+106RU+1N

106RU=52RU+2N+52RU

52RU=26RU+26RU

In a full band, 5 or 7 DCs are configured according to the influence of the DC offset. The number of DCs may be smaller than that of 80 MHz/160 MHz but not larger than 7, which is used in OFDMA.

The two-configuration option of the 996RU on both sides may be viewed in light of ensured performance (or capability) of 26RU or ensured performance of 484RU. Configurations of the 996RU in the middle and the RUs that follow are the same as the existing ax.

More specifically, the configuration of the 996RU on both sides may be proposed in two different structures. A first structure is a structure that puts a null tone on both sides of the 26RU in order to reduce the influence of the interference to/from an adjacent RU, and a second structure is a structure that is capable of reducing the influence of the interference between the 484RU and its adjacent RU. Since a RU using a small number of subcarriers, such as 26RU, causes significant influence on performance, it may be preferable to use the first structure.

The 996RU in the middle uses the same 996RU tone plan of the existing 80 MHz without modification. Additionally, 484/242/106/52RU may use the same structure as the existing (or conventional) 11ax without modification.

4. Exemplary Tone Plans

Figure 18:
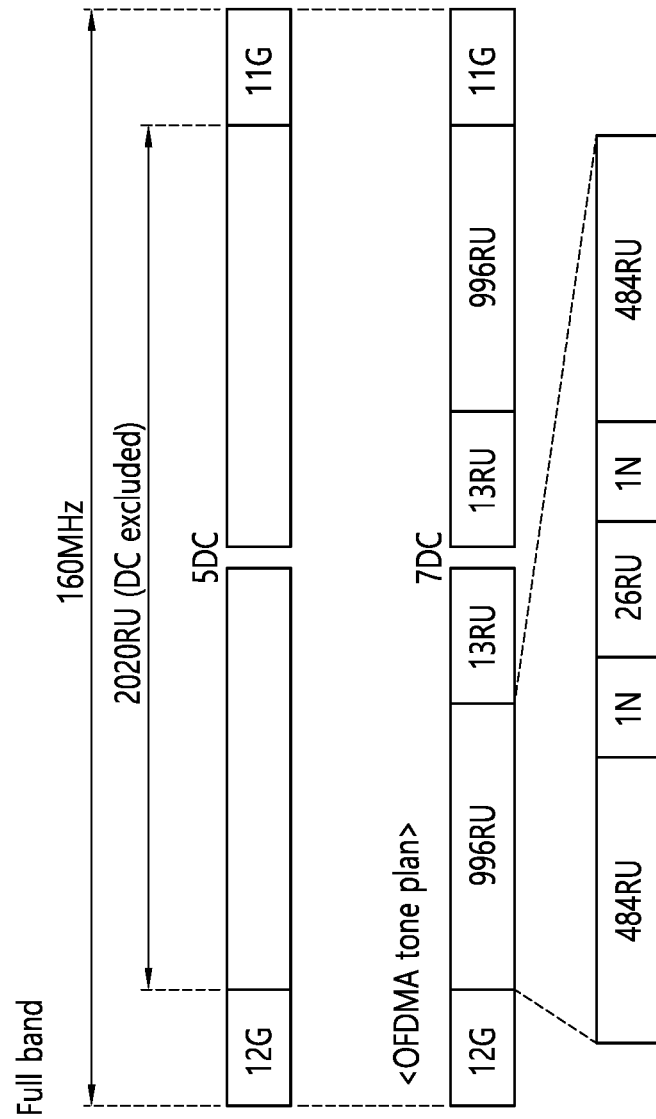
FIG. 18 shows an example of a t0one plan in a 160 MHz band according to the present embodiment.

FIG. 18 shows an example of a tone plan in a 160 MHz band according to the present embodiment.

A tone plan in case of a full band and a tone plan in case of applying OFDMA are both illustrated in FIG. 18.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 18 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 18 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 19:
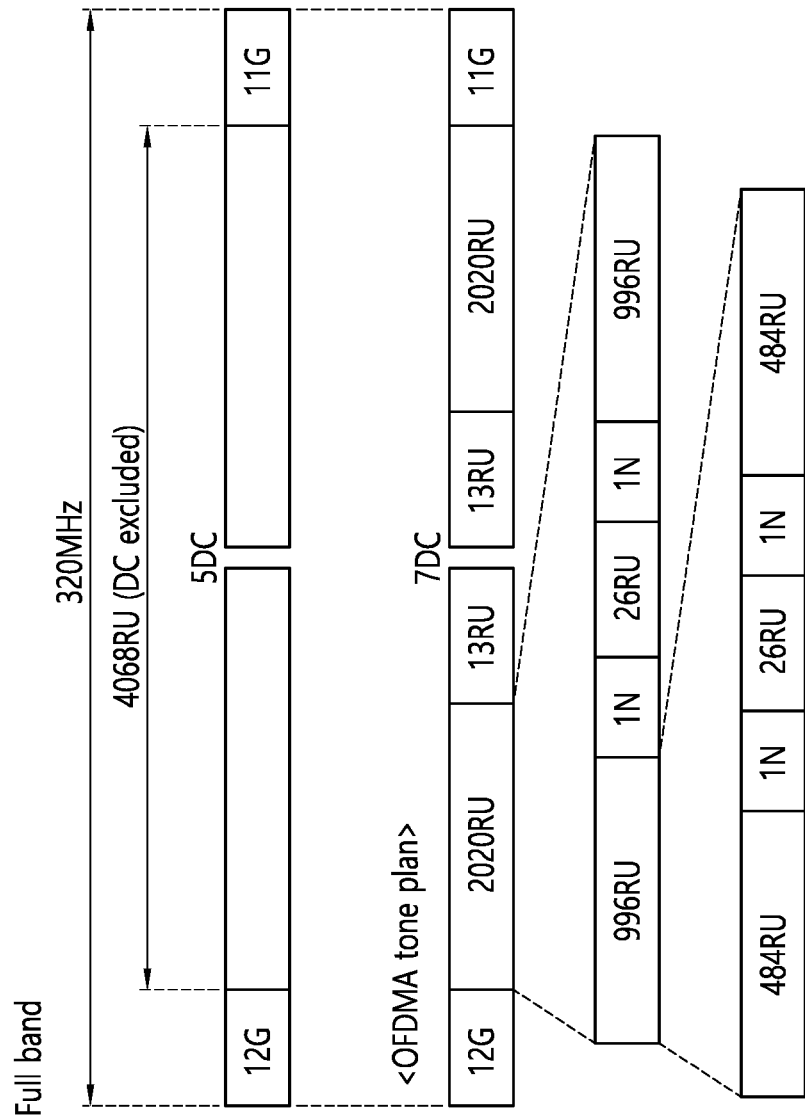
FIG. 19 shows an example of a tone plan in a 320 MHz band according to the present embodiment.

FIG. 19 shows an example of a tone plan in a 320 MHz band according to the present embodiment.

A tone plan in case of a full band and a tone plan in case of applying OFDMA are both illustrated in FIG. 19.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 19 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 19 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 20:
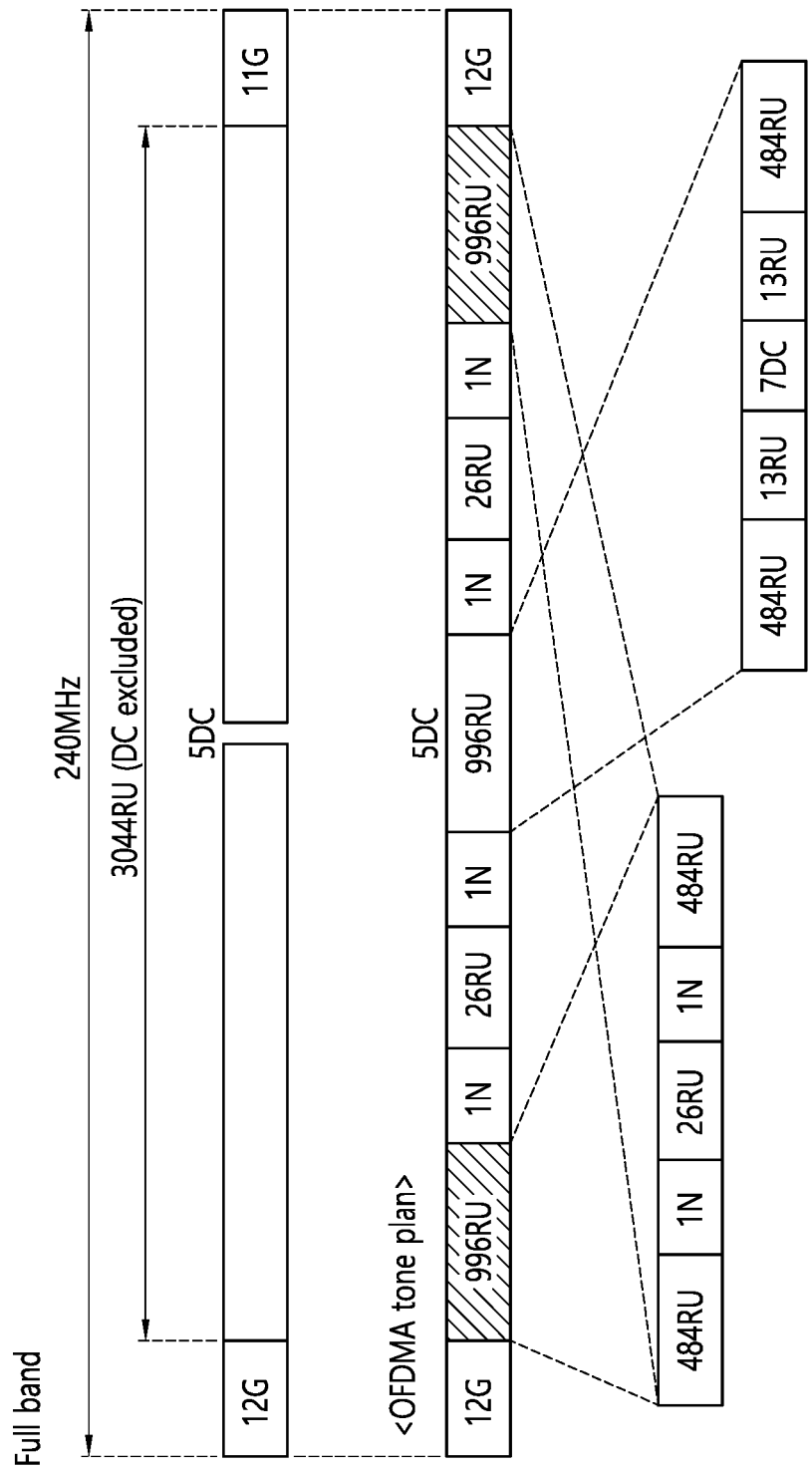
FIG. 20 shows an example of a tone plan in a 240 MHz band according to the present embodiment.

FIG. 20 shows an example of a tone plan in a 240 MHz band according to the present embodiment.

FIG. 20 illustrates both a tone plan in case of a full band and a tone plan in a case where OFDMA is applied, which are described above in tone plan 1.

Firstly, in case of a full band, a tone plan of 240 MHz may be configured in the order of 12 guard tones, 3044RU, 5 DC tones, and 11 guard tones. 5 DC tones may be positioned in the middle of the 160 MHz, and data may be transmitted from the 3044RU. However, FIG. 13 is merely an exemplary embodiment. And, therefore, the positions of the 12 guard tones and the 11 guard tones may be changed, and, if 7 DC tones are positioned in the middle of the 240 MHz, data may be transmitted from 3042RU.

In the case where OFDMA is applied, a tone plan of 320 MHz may be configured in the order of 12 guard tones, 996RU, 1N, 26RU, 1N, 996RU, 5 DC tones, 1N, 26RU, 1N, 996RU, and 11 guard tones.

Additionally, the 996RU on both ends may be configured of 484RU, 1 null tone, 26RU, 1 null tone, and 484RU. And, the 996RU in the middle may be configured of 484RU, 13RU, 7 DC tones, 13.RU, and 484RU. However, FIG. 13 is merely an exemplary embodiment. And, therefore, the positions of the 12 guard tones and the 11 guard tones may be changed, and the 996RU on both ends may be configured of 1 null tone, 484RU, 26RU, 484RU, and 1 null tone.

Since the tone plan may have the same structure as the existing 11ax starting from the 484RU, the structure will not be shown in the drawing.

5. Technical Objects that are to be Achieved in the Present Disclosure

This specification proposes phase rotation being applied to a legacy preamble in case of transmitting a packet by using 80/160/240/320 MHz in a wireless LAN system (802.11). Most particularly, by considering preamble puncturing adopted to 11ax at 80/160 MHz, and by applying 80 MHz-based preamble puncturing at 240/320 MHz, phase rotation that is optimized in such situation is proposed.

In a wireless LAN 802.11 system, transmission of increased stream(s) is being considered by using a wider band or a larger number of antennas than the existing 11ax, in order to increase the peak throughput. Additionally, a method of using an aggregation of various bands is also being considered.

This specification considers a case of using a wide band, i.e., a case of transmitting a packet by using 80/160/240/320 MHz, and proposes phase rotation being applied to a legacy preamble of such case. Most particularly, by considering preamble puncturing adopted to 11ax at 80/160 MHz, and by applying 80 MHz-based preamble puncturing at 240/320 MHz, phase rotation that is optimized in such situation is proposed.

Firstly, an encoding procedure of a PPDU may be described as follows.

An L-STF included in the PPDU may be configured according to the following procedure.

a) Determine the channel bandwidth from the TXVECTOR parameter CH_BANDWIDTH.
b) Sequence generation: Generate the L-STF sequence over the channel bandwidth as described in 27.3.10.3 (L-STF). Apply a 3 dB power boost if transmitting an HE ER SU PPDU as described in 27.3.10.3 (L-STF).
c) Phase rotation: Apply appropriate phase rotation for each 20 MHz subchannel as described in 27.3.9 (Mathematical description of signals) and 21.3.7.5 (Definition of tone rotation).
d) CSD per STS: if the TXVECTOR parameter BEAM_CHANGE is 0, apply CSD per STS for each space-time stream and frequency segment as described in 27.3.10.2.2 (Cyclic shift for HE modu-laced fields).
e) Spatial mapping: If the TXVECTOR parameter BEAM_CHANGE is 0, apply the A matrix and the Q matrix as described in 27.3.10.3 (L-STF).
f) IDFT: Compute the inverse discrete Fourier transform.
g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
h) Insert GI and apply windowing: Prepend a GI ($T_{GI,Pre-HE}$) and apply windowing as described in 27.3.9 (Mathematical description of signals).
i) Analog and RF: Upconvert the resulting complex baseband waveform associated with each transmit chain to an RF signal according to the center frequency of the desired channel and transmit. Refer to 27.3.9 (Mathematical description of signals) and 27.3.10 (HE preamble) for details.

An L-LTF included in the PPDU may be configured according to the following procedure.

a) Determine the channel bandwidth from the TXVECTOR parameter CH_BANDWIDTH.
b) Sequence generation: Generate the L-LTF sequence over the channel bandwidth as described in 27.3.10.4 (L-LTF). Apply a 3 dB power boost if transmitting an HE ER SU PPDU as described in 27.3.10.4 (L-LTF).
c) Phase rotation: Apply appropriate phase rotation for each 20 MHz subchannel as described in 27.3.9 (Mathematical description of signals) and 21.3.7.5 (Definition of tone rotation).
d) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
e) Spatial mapping: If the TXVECTOR parameter BEAM_CHANGE is 0, apply the A matrix and the Q matrix as described in 27.3.10.4 (L-LTF).
f) IDFT: Compute the inverse discrete Fourier transform.
g) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
h) Insert GI and apply windowing: Prepend a GI ($T_{GI,L-LTF}$) and apply windowing as described in 27.3.9 (Mathematical description of signals).
i) Analog and RF: Upconvert the resulting complex baseband waveform associated with each transmit chain to an RF signal according to the carrier frequency of the desired channel and transmit. Refer to 27.3.9 (Mathematical description of signals) and 27.3.10 (HE preamble) for details.

An L-SIG included in the PPDU may be configured according to the following procedure.

a) Set the RATE subfield in the SIGNAL field to 6 Mb/s. Set the LENGTH, Parity, and Tail fields in the SIGNAL field as described in 27.3.10.5 (L-SIG).
b) BCC encoder: Encode the SIGNAL field by a convolutional encoder at the rate of R=½ as described in 27.3.11.5.1 (Binary convolutional coding and puncturing).
c) BCC interleaver: Interleave as described in 17.3.5.7 (BCC interleavers).
d) Constellation Mapper: BPSK modulate as described in 27.3.11.9 (Constellation mapping).
e) Pilot insertion: Insert pilots as described in 27.3.10.5 (L-SIG).
f) Extra tone insertion: Four extra tones are inserted in subcarriers $k \in \{-28, -27, 27, 28\}$ for channel estimation purpose and the values on these four extra tones arc $\{-1, -1, -1, 1\}$, respectively. Apply a 3 dB power boost to the four extra tones if transmitting an HE ER SU PPDU as described in 27.3.10.5 (L-SIG).
g) Duplication and phase rotation: Duplicate the L-SIG field over each occupied 20 MHz subchannel of the channel bandwidth. Apply appropriate phase rotation for each occupied 20 MHz subchannel as described in 27.3.9 (Mathematical description of signals) and 21.3.7.5 (Definition of tone rotation).
h) CSD per STS: If the TXVECTOR parameter BEAM_CHANGE is 0, apply CSD per STS for each space-time stream and frequency segment as described in 27.3.10.2.2 (Cyclic shift for HE modulated fields) before spatial mapping.
i) Spatial mapping: If the TXVECTOR parameter BEAM_ CHANGE is 0, apply the A matrix and Q matrix as described in 27.3.10.5 (L-SIG).
j) IDFT: Compute the inverse discrete Fourier transform.
k) CSD per chain: If the TXVECTOR parameter BEAM_CHANGE is 1 or not present, apply CSD per chain for each transmit chain and frequency segment as described in 27.3.10.2.1 (Cyclic shift for pre-HE modulated fields).
l) Insert GI and apply windowing: Prepend a GI ($T_{GI,Pre-HE}$) and apply windowing as described in 27.3.9 (Mathematical description of signals).
m) Analog and RF: Upconvert the resulting complex baseband waveform associated with each transmit chain. Refer to 27.3.9 (Mathematical description of signals) and 27.3.10 (HE preamble) for details.

The L-STF, L-LTF, and L-SIG may apply adequate phase rotation in 20 MHz subchannel units (ref c) of the L-STF, c) of the L-LTF, and g) of the L-SIG). At this point, L-SIG may be duplicated in 20 MHz units when transmitted from a bandwidth equal to or larger than 40 MHz and may apply each phase transmission one by one (ref g) of L-SIG). The phase rotation may be described in more detail as follows.

The following shows a phase rotation being used in a legacy preamble and HE-SIG-A/B in the existing 11ax.

Function $Y_{k,BW}$ is used for indicating a rotation of a tone. The $Y_{k,BW}$ may be defined by a phase rotation value. In $Y_{k,BW}$, the bandwidth (BW) is determined by TXVECTOR parameter CH_BANDWIDTH, which is defined in the following table. At this point, k is a subcarrier index.

TABLE 1

| CH_BANDWIDTH | $Y_{k,BW}$ |
|---|---|
| CBW20 | $Y_{k,20}$ |
| CBW40 | $Y_{k,40}$ |
| CBW80 | $Y_{k,80}$ |
| CBW160 | $Y_{k,160}$ |
| CBW80 + 80 | $Y_{k,80}$ per frequency segment |

Hereinafter, $Y_{k,BW}$ according to the bandwidth will be defined.
For a 20 MHz PPDU transmission,
$Y_{k,20}=1$
For a 40 MHz PPDU transmission, $$Y_{k,40} = \begin{cases} 1, & k < 0 \\ j, & k \geq 0 \end{cases}$$

For an 80 MHz PPDU transmission, $$Y_{k,80} = \begin{cases} 1, & k < -64 \\ -1, & k \geq -64 \end{cases}$$

For an 80+80 MHz PPDU transmission, each 80 MHz frequency segment shall use a phase rotation for the 80 MHz PPDU transmission.
For a 160 MHz PPDU transmission.

$$Y_{k,160} = \begin{cases} 1, & k < -192 \\ -1, & -192 \leq k < 0 \\ 1, & 0 \leq k < 64 \\ -1, & 64 \leq k \end{cases}$$

As it is apparent in the description presented above, 160 MHz is used by repeating the phase rotation of 80 MHz two times.

In Wi-Fi succeeding 11ax, a wider band may be used in order to enhance the peak throughput, and this application considers a band of up to 240/320 MHz. Additionally, although the form of the packet that is to be used is unknown, it will be apparent that the start of the packet will be a legacy preamble for its co-existence with the existing legacy. Additionally, by using more enhanced hardware and RF, a situation where a contiguous 160/240/320 MHz packet is transmitted by using one RF may also be considered. The present application proposes various methods of phase rotation for optimizing PAPR in L-STF and L-LTF by considering such situations. And, most particularly, by considering preamble puncturing proposed in 1 1 ax at 80/160 MHz, and by applying 80 MHz-based preamble puncturing at 240/320 MHz, the present application proposes a maximum PAPR for minimizing the phase rotation. In this case, the phase rotation considers a method having one unified form and not a method having different values according to the preamble puncturing pattern. For example, when considering 20 MHz-based 11ax preamble puncturing at 80/160 MHz, a primary 20 MHz may always be used for PPDU transmission, whereas a secondary 20/40/80 MHz may not be used for the PPDU transmission. Alternatively, when considering 80 MHz-based preamble puncturing at 240/320 MHz, a primary 80 MHz may always be used for PPDU transmission, whereas a secondary 80/160 MHz may not be used for the PPDU transmission. In such various preamble puncturing patterns, a specific phase rotation is applied, and, by calculating a PAPR for each preamble puncturing pattern, a maximum PAPR value is extracted. Even in a case where another phase rotation is applied, this is repeated so as to extract a maximum PAPAR from each phase rotation. Thereafter, by comparing the extracted maximum PAPR values, an optimized phase rotation may be selected.

The following shows various 80 MHz preamble puncturing patterns. O represents an 80 MHz channel that is used, and X represents an 80 MHz channel that is not used.
240 MHz: {OOO}, {OOX}, {OXO}, {OXX}, {XOO}, {XOX}, WWI
320 MHz: {OOOO}, {OOOX}, {OOXO}, {OOXX}, {OXOO}, {OXOX}, {OXXO}, {OXXX}, {XOOO}, {XOOX}, {XOXO}, {XOXX}, {XXOO}, {XXOX}, {XXXO}

Meanwhile, in 11ax, since the same phase rotation of the existing 11ac is applied at 80/160 MHz, without modification, without considering the preamble puncturing, a good PAPR cannot be ensured. Therefore, this specification provides a solution that can reduce the PAPR and increase hardware efficiency by proposing a new phase rotation considering preamble puncturing not only in a 240/320 MHz situation but also in an 80/160 MHz situation.

The following are L-STF and L-LTF sequence corresponding to 20 MHz. And, in a wide bandwidth, these sequences are directly applied to each 20 MHz bandwidth without modification.
L-STF=sqrt(½)*[0 0 0 0 0 0 0 0 1 +j 0 0 0 -1 -j 0 0 0 1 +j 0 0 0 -1 -j 0 0 0 -1 -j 0 0 0 1 +j 0 0 0 0 0 0 0 -1 -j 0 0 0 -1 -j 0 0 0 1 +j 0 0 0 1 +j 0 0 01 +j 0 0 0 1 +j 0 0 0 0 0 0 0]
L-LTF=[0 0 0 00 0 1 1 -1 -1 1 1 -1 1 -1 1 1 1 1 1 1 -1 -1 1 1 -1 1 1 1 1 1 0 1 -1 -1 1 1 -1 1 -1 1 1 -1 -1 -1 -1 -1 -1 -1 1 1 -1 -1 1 -1 1 -1 1 1 1 1 0 0 0 0 0]

As presented above, in a signal that is repeated in a frequency domain, the PAPR may become very large, and, in order to reduce the increased PAPR, a phase rotation is applied, as proposed below. Additionally, in the proposed phase rotation situation, a maximum PAPR in the L-STF and L-LTF considering preamble puncturing will be proposed as follows.

A. 80 MHz (apply 20 MHz preamble puncturing, when 80 MHz band is represented by subcarrier index, $-128 \leq k < 127$, wherein k is subcarrier index)
1) Apply existing phase rotation without modification
As shown below the existing phase rotation may be applied without modification. However, in situations where preamble puncturing is considered, this may not be preferable since the maximum PAPR (ref. Table 12) may be relatively larger than the proposals of A. 2) and 3), which will hereinafter be described in detail.
Gamma_k,80=1 if k<−64
−1 if −64≤k

TABLE 2

| L-STF | L-LTF |
|---|---|
| 6.8606 | 7.9370 |

Gamma_k,BW means a phase rotation value in k subcarrier index of a contiguous BW bandwidth.

2) PAPR-optimized phase rotation being applied for each 20 MHz bandwidth

The following indicates the phase rotation being applied in 20 MHz bandwidth units for optimizing PAPR in L-STF and the PAPR.

Gamma_k,80=1 if k<−64
j if −64≤k<0
1 if 0≤k<64
j if 64≤k
or
Gamma_k,80=1 if k<−64
−j if −64≤k<0
1 if 0≤k<64
−j if 64≤k

TABLE 3

| L-STF | L-LTF |
|---|---|
| 5.8219 | 6.8980 |

The following indicates the phase rotation being applied in 20 MHz bandwidth units for optimizing PAPR in L-LTF and the PAPR.

Gamma_k,80=1 if k<−64
1 if −64≤k<0
−1 if 0≤k<64
−1 if 64≤k

TABLE 4

| L-STF | L-LTF |
|---|---|
| 5.8847 | 6.6178 |

The three phase rotations presented above have similar PAPRs within each field. However, if only one PAPR value is to be selected, in light of the overall packet, a phase rotation optimizing the L-LTF that has the largest PAPR may be preferred.

3) Phase rotation having similar performance as PAPR-optimized phase rotation being applied for each 20 MHz bandwidth The following shows a phase rotation having similar PAPR as the phase rotations proposed above in A. 2) and its PAPR.

Gamma_k,80=1 if k<−64
−1 if −64≤k<0
−1 if 0≤k<64
1 if 64≤k

TABLE 5

| L-STF | L-LTF |
|---|---|
| 5.9681 | 6.7153 |

B. 160 MHz (apply 20 MHz preamble puncturing, when 160 MHz band is represented by subcarrier index, −256≤k<255)

160 MHz includes both contiguous 160 MHz/non-contiguous 160 MHz, and the non-contiguous 160 MHz may be 80+80 MHz. Most particularly, in case of the non-contiguous situation, each channel may be positioned in different bands. And, even in such case, for simplification, the phase rotation shown below may be applied without modification, or since it is apparent that different RFs may be used, and since this has no influence on the PAPR, each phase rotation may be applied according to the channel size being used within the band. This may also be applied in 240/320 MHz.

The contiguous/non-contiguous 160 MHz phase rotations that are proposed below may be applied without modification to the 160 MHz part of a non-contiguous transmission situation of the wider 240/320 MHz.

1) Repeat 80 MHz Phase Rotation

This is a same approach as the method used in the existing 11ax. And, in a situation where a contiguous 160 MHz packet is transmitted by using one RF, and in a situation where a contiguous/non-contiguous 160 MHz packet is transmitted for each 80 MHz by using two RFs, the phase rotation may be unified. That is, the phase rotation that is proposed above for 80 MHz may be applied by repeating the phase rotation two times. The contiguous 160 MHz may be expressed as shown below, and the maximum PAPR is also as shown below.

Gamma_k,160=1 if k<−192
1 if −192≤k<−128
−1 if −128≤k<−64
−1 if −64≤k<0
1 if 0≤k<64
1 if 64≤k<128
−1 if 128≤k<192
−1 if 192≤k

TABLE 6

| L-STF | L-LTF |
|---|---|
| 8.4454 | 9.1864 |

Gamma_k,160=1 if k<−192
−1 if −192≤k<−128
−1 if −128≤k<−64
1 if −64≤k<0
1 if 0≤k<64
−1 if 64≤k<128
−1 if 128≤k<192
1 if 192≤k

TABLE 7

| L-STF | L-LTF |
|---|---|
| 8.4874 | 9.1864 |

Gamma_k,160=1 if k<−192
j if −192≤k<−128
1 if −128≤k<−64
j if −64≤k<0
1 if 0≤k<64
j if 64≤k<128
1 if 128≤k<192
j if 192≤k

TABLE 8

| L-STF | L-LTF |
|---|---|
| 8.3369 | 9.4172 |

Gamma_k,160=1 if k<−192
−j if −192≤k<−128
1 if −128≤k<−64
−j if −64≤k<0

1 if 0≤k<64
−j if 64≤k<128
1 if 128≤k<192
−j if 192≤k

TABLE 9

| L-STF | L-LTF |
|---|---|
| 8.3369 | 9.4172 |

Gamma_k,160=1 if k<−192
−1 if −192≤k<−128
−1 if −128≤k<−64
−1 if −64≤k<0
1 if 0≤k<64
−1 if 64≤k<128
−1 if 128≤k<192
−1 if 192≤k

TABLE 10

| L-STF | L-LTF |
|---|---|
| 9.8709 | 10.9473 |

When considering anon-contiguous 160 MHz, i.e., 80+80 MHz, the proposal of A shall be applied to each 80 MHz without modification.

In the various proposals that are presented above, repetition of an existing phase rotation that did not have a good PAPR at 80 MHz (phase rotation of the existing 160 MHz) has a poorer PAPR as compared to other phase rotations. Therefore, this may not be preferable.

2) Repeat 80 MHz phase rotation and add phase rotation in 80 MHz bandwidth units This is a method of optimizing the PAPR even more by repeating the 80 MHz phase rotation two times and additionally applying a phase rotation in each 80 MHz unit. Since the 80 MHz unit is being maintained, this method may also unify the phase rotation in a situation where a contiguous 160 MHz packet is transmitted by using one RF, and in a situation where a contiguous/non-contiguous 160 MHz packet is transmitted for each 80 MHz by using two RFs.

In this case, with the exception for the fifth phase rotation of the case where the existing 80 MHz phase rotation is applied (B. 1), the other phase rotations are all the same, and a case of repeating the existing 80 MHz phase rotation and adding phase rotations is 80 MHz bandwidth units is as follows.

Gamma_k,160=1 if k<−192
−1 if −192≤k<−128
−1 if −128≤k<−64
−1 if −64≤k<0
−1 if 0≤k<64
1 if 64≤k<128
1 if 128≤k<192
1 if 192≤k

TABLE 11

| L-STF | L-LTF |
|---|---|
| 8.1473 | 9.1912 |

In light of unifying the phase rotation of the contiguous/non-contiguous 160 MHz and the overall packet, the first two phase rotations of B. 1), which minimize the PAPR of the L-LTF having the greater PAPR value, may be preferred. And, when also considering the L-STF, the first phase rotation of B. 1) may be preferred.

3) PAPR-Optimized Phase Rotation being Applied for Each 20 MHz Bandwidth

This method is a phase rotation that is applied in 20 MHz bandwidth units for optimizing the PAPR in a case where a contiguous 160 MHz packet is transmitted by using one RF. And, the phase rotation is as follows. Although the subcarrier index may be calibrated and applied to a non-contiguous 160 MHz (i.e., in the following equations, phase rotation of −256≤k<0 may be applied to an 80 MHz having a low frequency, and phase rotation of 0≤k<256 may be applied to an 80 MHz having a high frequency), this may not be optimal in light of PAPR.

The phase rotation(s) optimized in L-STF is as follows.
Gamma_k,160=1 if k<−192
j if −192≤k<−128
1 if −128≤k<−64
j if −64≤k<0
−j if 0≤k<64
−1 if 64≤k<128
−j if 128≤k<192
−1 if 192≤k
or
Gamma_k,160=1 if k<−192
−j if −192≤k<−128
1 if −128≤k<−64
−j if −64≤k<0
j if 0≤k<64
−1 if 64≤k<128
j if 128≤k<192
−1 if 192≤k

TABLE 12

| L-STF | L-LTF |
|---|---|
| 8.0872 | 9.3379 |

The phase rotation(s) optimized in L-LTF is as follows.
Gamma_k,160=1 if k<−192
1 if −192≤k<−128
−1 if −128≤k<−64
−1 if −64≤k<0
−j if 0≤k<64
j if 64≤k<128
j if 128≤k<192
−j if 192≤k
or
Gamma_k,160=1 if k<−192
1 if −192≤k<−128
−1 if −128≤k<−64
−1 if −64≤k<0
j if 0≤k<64
−j if 64≤k<128
−j if 128≤k<192
j if 192≤k
or
Gamma_k,160=1 if k<−192
−1 if −192≤k<−128
−1 if −128≤k<−64
1 if −64≤k<0
j if 0≤k<64
j if 64≤k<128
−j if 128≤k<192
−j if 192≤k or $\text{Gamma\_k},160=1$ if $k<-192$
$-1$ if $-192\leq k<-128$
$-1$ if $-128\leq k<-64$
$1$ if $-64\leq k<0$
$-j$ if $0\leq k<64$
$-j$ if $64\leq k<128$
$j$ if $128\leq k<192$
$j$ if $192\leq k$

TABLE 13

| L-STF | L-LTF |
|---|---|
| 8.4274 | 9.0720 |

When considering only the PAPR of a contiguous 160 MHz, in light of the overall packet, the second group of phase rotations of B. 3), which minimizes the PAPR of the L-LTF having the greater PAPR value, may be preferred.

C. 240 MHz (apply 80 MHz preamble puncturing, when 240 MHz band is represented by subcarrier index, $-384\leq k<383$)

240 MHz includes both contiguous 240 MHz/non-contiguous 240 MHz, and the non-contiguous 240 MHz may be 160+80/80+160/80+80+80 MHz. The contiguous/non-contiguous 240 MHz phase rotations that are proposed below may be applied without modification to the 240 MHz part of a non-contiguous transmission situation of the wider 320 MHz.

1) Repeat 80 MHz Phase Rotation

This is a same approach as the method used in the existing 11ax. And, in a situation where a contiguous 240 MHz packet is transmitted by using one RF, and in a situation where a contiguous/non-contiguous 240 MHz packet is transmitted for each 80 MHz by using multiple RFs, the phase rotation may be unified. That is, the phase rotation that is proposed above for 80 MHz may be applied by repeating the phase rotation three times. The contiguous 240 MHz may be expressed as shown below, and the maximum PAPR is also as shown below.

$\text{Gamma\_k},240=1$ if $k<-320$
$1$ if $-320\leq k<-256$
$-1$ if $-256\leq k<-192$
$-1$ if $-192\leq k<-128$
$1$ if $-128\leq k<-64$
$1$ if $-64\leq k<0$
$-1$ if $0\leq k<64$
$-1$ if $64\leq k<128$
$1$ if $128\leq k<192$
$1$ if $192\leq k<256$
$-1$ if $256\leq k<320$
$-1$ if $320\leq k$

TABLE 14

| L-STF | L-LTF |
|---|---|
| 10.0209 | 10.5650 |

$\text{Gamma\_k},240=1$ if $k<-320$
$-1$ if $-320\leq k<-256$
$-1$ if $-256\leq k<-192$
$1$ if $-192\leq k<-128$
$1$ if $-128\leq k<-64$
$-1$ if $-64\leq k<0$
$-1$ if $0\leq k<64$
$1$ if $64\leq k<128$
$1$ if $128\leq k<192$
$-1$ if $192\leq k<256$
$-1$ if $256\leq k<320$
$1$ if $320\leq k$

TABLE 15

| L-STF | L-LTF |
|---|---|
| 10.0209 | 10.5650 |

$\text{Gamma\_k},240=1$ if $k<-320$
$j$ if $-320\leq k<-256$
$1$ if $-256\leq k<-192$
$j$ if $-192\leq k<-128$
$1$ if $-128\leq k<-64$
$j$ if $-64\leq k<0$
$1$ if $0\leq k<64$
$j$ if $64\leq k<128$
$1$ if $128\leq k<192$
$j$ if $192\leq k<256$
$1$ if $256\leq k<320$
$j$ if $320\leq k$

TABLE 16

| L-STF | L-LTF |
|---|---|
| 9.8709 | 10.9473 |

$\text{Gamma\_k},240=1$ if $k<-320$
$-j$ if $-320\leq k<-256$
$1$ if $-256\leq k<-192$
$-j$ if $-192\leq k<-128$
$1$ if $-128\leq k<-64$
$-j$ if $-64\leq k<0$
$1$ if $0\leq k<64$
$-j$ if $64\leq k<128$
$1$ if $128\leq k<192$
$-j$ if $192\leq k<256$
$1$ if $256\leq k<320$
$-j$ if $320\leq k$

TABLE 17

| L-STF | L-LTF |
|---|---|
| 9.8709 | 10.9473 |

$\text{Gamma\_k},240=1$ if $k<-320$
$-1$ if $-320\leq k<-256$
$-1$ if $-256\leq k<-192$
$-1$ if $-192\leq k<-128$
$1$ if $-128\leq k<-64$
$-1$ if $-64\leq k<0$
$-1$ if $0\leq k<64$
$-1$ if $64\leq k<128$
$1$ if $128\leq k<192$
$-1$ if $192\leq k<256$
$-1$ if $256\leq k<320$
$-1$ if $320\leq k$

TABLE 18

| L-STF | L-LTF |
|---|---|
| 7.3583 | 8.4065 |

In a non-contiguous 240 MHz, the phase rotations of each contiguous 80/160 MHz may be proposed as shown in 1) of A and B.

The simple repetition of the phase rotation that is presented in the above-described various proposals has a relatively poor PAPR as compared to the following proposal of 2), and, most particularly, the repetition of the existing phase rotation has a poorer PAPR as compared to other phase rotations. Therefore, the proposals presented above may not be preferable.

2) Repeat 80 MHz Phase Rotation and Add Phase Rotation in 80 MHz Bandwidth Units This is a method of optimizing the PAPR even more by repeating the 80 MHz phase rotation three times and additionally applying a phase rotation in each 80 MHz unit. Since the 80 MHz unit is being maintained, this method may also unify the phase rotation in a situation where a contiguous 240 MHz packet is transmitted by using one RF, and in a situation where a contiguous/non-contiguous 240 MHz packet is transmitted for each 80 MHz by using multiple RFs.

The following indicates a phase rotation having the phase rotation being optimized in 20 MHz bandwidth units added thereto in L-STF and L-LTF and the PAPR.

Gamma_k,240=1 if k<−320
1 if −320≤k<−256
−1 if −256≤k<−192
−1 if −192≤k<−128
1 if −128≤k<−64
1 if −64≤k<0
−1 if 0≤k<64
−1 if 64≤k<128
−1 if 128≤k<192
−1 if 192≤k<256
1 if 256≤k<320
1 if 320≤k
or
Gamma_k,240=1 if k<−320
1 if −320≤k<−256
−1 if −256≤k<−192
−1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k
or
Gamma_k,240=1 if k<−320
1 if −320≤k<−256
−1 if −256≤k<−192
−1 if −192≤k<−128
j if −128≤k<−64
j if −64≤k<0
−j if 0≤k<64
−j if 64≤k<128
1 if 128≤k<192
1 if 192≤k<256
−1 if 256≤k<320
−1 if 320≤k
or
Gamma_k,240=1 if k<−320
1 if −320≤k<−256
−1 if −256≤k<−192
−1 if −192≤k<−128
−j if −128≤k<−64
−j if −64≤k<0
j if 0≤k<64
j if 64≤k<128
1 if 128≤k<192
1 if 192≤k<256
−1 if 256≤k<320
−1 if 320≤k

TABLE 19

| L-STF | L-LTF |
|---|---|
| 8.8950 | 9.6281 |

Gamma_k,240=1 if k<−320
−1 if −320≤k<−256
−1 if −256≤k<−192
1 if −192≤k<−128
j if −128≤k<−64
−j if −64≤k<0
−j if 0≤k<64
j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
−j if −128≤k<−64
j if −64≤k<0
j if 0≤k<64
−j if 64≤k<128
1 if 128≤k<192
−1 if 192≤k<256
−1 if 256≤k<320
1 if 320≤k
or
Gamma_k,240=1 if k<−320
−1 if −320≤k<−256
−1 if −256≤k<−192
1 if −192≤k<−128
1 if −128≤k<−64
−1 if −64≤k<0
−1 if 0≤k<64
1 if 64≤k<128
−1 if 128≤k<192
1 if 192≤k<256
1 if 256≤k<320
−1 if 320≤k
or
Gamma_k,240=1 if k<−320
−1 if −320≤k<−256
−1 if −256≤k<−192
1 if −192≤k<−128
−1 if −128≤k<−64
1 if −64≤k<0
1 if 0≤k<64

−1 if 64≤k<128
−1 if 128≤k<192
1 if 192≤k<256
1 if 256≤k<320
−1 if 320≤k

TABLE 20

| L-STF | L-LTF |
|---|---|
| 8.9784 | 9.7256 |

Gamma_k,240=1 if k<−320
j if −320≤k<−256
1 if −256≤k<−192
j if −192≤k<−128
j if −128≤k<−64
−1 if −64≤k<0
j if 0≤k<64
−1 if 64≤k<128
1 if 128≤k<192
j if 192≤k<256
1 if 256≤k<320
j if 320≤k
or
Gamma_k,240=1 if k<−320
j if −320≤k<−256
1 if −256≤k<−192
j if −192≤k<−128
−j if −128≤k<−64
1 if −64≤k<0
−j if 0≤k<64
1 if 64≤k<128
1 if 128≤k<192
j if 192≤k<256
1 if 256≤k<320
j if 320≤k
or
Gamma_k,240=1 if k<−320
j if −320≤k<−256
1 if −256≤k<−192
j if −192≤k<−128
1 if −128≤k<−64
j if −64≤k<0
1 if 0≤k<64
j if 64≤k<128
−1 if 128≤k<192
−j if 192≤k<256
−1 if 256≤k<320
−j if 320≤k
or
Gamma_k,240=1 if k<−320
j if −320≤k<−256
1 if −256≤k<−192
j if −192≤k<−128
−1 if −128≤k<−64
−j if −64≤k<0
−1 if 0≤k<64
−j if 64≤k<128
−1 if 128≤k<192
−j if 192≤k<256
−1 if 256≤k<320
−j if 320≤k

TABLE 21

| L-STF | L-LTF |
|---|---|
| 8.8322 | 9.9083 |

Gamma_k,240=1 if k<−320
−j if −320≤k<−256
1 if −256≤k<−192
−j if −192≤k<−128
j if −128≤k<−64
1 if −64≤k<0
j if 0≤k<64
1 if 64≤k<128
1 if 128≤k<192
−j if 192≤k<256
1 if 256≤k<320
−j if 320≤k
or
Gamma_k,240=1 if k<−320
−j if −320≤k<−256
1 if −256≤k<−192
−j if −192≤k<−128
−j if −128≤k<−64
−1 if −64≤k<0
−j if 0≤k<64
−1 if 64≤k<128
1 if 128≤k<192
−j if 192≤k<256
1 if 256≤k<320
−j if 320≤k
or
Gamma_k,240=1 if k<−320
−j if −320≤k<−256
1 if −256≤k<−192
−j if −192≤k<−128
1 if −128≤k<−64
−j if −64≤k<0
1 if 0≤k<64
−j if 64≤k<128
−1 if 128≤k<192
j if 192≤k<256
−1 if 256≤k<320
j if 320≤k
or
Gamma_k,240=1 if k<−320
−j if −320≤k<−256
1 if −256≤k<−192
−j if −192≤k<−128
−1 if −128≤k<−64
j if −64≤k<0
−1 if 0≤k<64
j if 64≤k<128
−1 if 128≤k<192
j if 192≤k<256
−1 if 256≤k<320
j if 320≤k

TABLE 22

| L-STF | L-LTF |
|---|---|
| 8.8322 | 9.9083 |

Gamma_k,240=1 if k<−320
−1 if −320≤k<−256
−1 if −256≤k<−192

−1 if −192≤k<−128
−1 if −128≤k<−64
1 if −64≤k<0
1 if 0≤k<64
1 if 64≤k<128
−1 if 128≤k<192
1 if 192≤k<256
1 if 256≤k<320
1 if 320≤k
or
Gamma_k,240=1 if k<−320
−1 if −320≤k<−256
−1 if −256≤k<−192
−1 if −192≤k<−128
1 if −128≤k<−64
−1 if −64≤k<0
−1 if 0≤k<64
−1 if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
j if −128≤k<−64
−j if −64≤k<0
−j if 0≤k<64
−j if 64≤k<128
1 if 128≤k<192
−1 if 192≤k<256
−1 if 256≤k<320
−1 if 320≤k
or
Gamma_k,240=1 if k<−320
−1 if −320≤k<−256
−1 if −256≤k<−192
−1 if −192≤k<−128
−j if −128≤k<−64
j if −64≤k<0
j if 0≤k<64
j if 64≤k<128
1 if 128≤k<192
−1 if 192≤k<256
−1 if 256≤k<320
−1 if 320≤k

TABLE 23

| L-STF | L-LTF |
|---|---|
| 7.3583 | 8.4065 |

A subcarrier index may be calibrated and also applied to a non-contiguous 240 MHz. And, in the equation presented above, the phase rotation of −384≤k<−128 may be applied to the 80 MHz having a lowest frequency, the phase rotation of −128≤k<128 may be applied to the 80 MHz having a second lowest frequency, and the phase rotation of 128≤k<384 may be applied to the 80 MHz having a highest frequency.

In light of unifying the phase rotation of the contiguous/non-contiguous 240 MHz and the overall packet, the seventh group of phase rotations, which minimizes the PAPR of the L-LTF having the greater PAPR value, may be preferred.

D. 320 MHz (apply 80 MHz preamble puncturing, when 320 MHz band is represented by subcarrier index, −512≤k<511)

320 MHz includes both contiguous 320 MHz/non-contiguous 320 MHz, and the non-contiguous 320 MHz may be 240+80/80+240/160+160/160+80+80/80+160+80/80+80+160/80+80+80+80 MHz.

1) Repeat 80 MHz Phase Rotation

This is a same approach as the method used in the existing 11ax. And, in a situation where a contiguous 320 MHz packet is transmitted by using one RF, and in a situation where a contiguous/non-contiguous 320 MHz packet is transmitted for each 80 MHz by using multiple RFs, the phase rotation may be unified. That is, the phase rotation that is proposed above for 80 MHz may be applied by repeating the phase rotation four times. The contiguous 320 MHz may be expressed as shown below, and the maximum PAPR is also as shown below.

Gamma_k,320=1 if k<−448
1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 24

| L-STF | L-LTF |
|---|---|
| 11.2703 | 11.8144 |

Gamma_k,320=1 if k<−448
−1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64

−1 if 64≤k<128
−1 if 128≤k<192
1 if 192≤k<256
1 if 256≤k<320
−1 if 320≤k<384
−1 if 384≤k<448
1 if 448≤k<512

TABLE 25

| L-STF | L-LTF |
|---|---|
| 11.2703 | 11.8144 |

Gamma_k,320=1 if k<−448 j if −448≤k<−284
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 26

| L-STF | L-LTF |
|---|---|
| 11.1203 | 12.1967 |

Gamma_k,320=1 if k<−448 −j if −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 27

| L-STF | L-LTF |
|---|---|
| 11.1203 | 12.1967 |

Gamma_k,320=1 If k<−448 −1 If −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 28

| L-STF | L-LTF |
|---|---|
| 8.2600 | 9.1864 |

In a non-contiguous 320 MHz, the phase rotations of each contiguous 80/160/240 MHz may be proposed as shown in 1) of A and B and in 1) of C.

The simple repetition of the phase rotation that is presented in the above-described various proposals has a relatively poor PAPR as compared to the following proposal of 2), and, most particularly, the repetition of the existing phase rotation has a poorer PAPR as compared to other phase rotations. Therefore, the proposals presented above may not be preferable.

2) Repeat 80 MHz phase rotation and add phase rotation in 80 MHz bandwidth units This is a method of optimizing the PAPR even more by repeating the 80 MHz phase rotation four times and additionally applying a phase rotation in each 80 MHz unit. Since the 80 MHz unit is being maintained, this method may also unify the phase rotation in a situation where a contiguous 320 MHz packet is transmitted by using one RF, and in a situation where a contiguous/non-contiguous 320 MHz packet is transmitted for each 80 MHz by using multiple RFs.

The following indicates a phase rotation having the phase rotation being optimized in 80 MHz bandwidth units added thereto in L-STF and L-LTF and the PAPR.

Gamma_k,320=1 if k<−448
1 if −448≤k<−384
−1 if −384≤k<−320
−1 if −320≤k<−256
j if −256≤k<−192
j if −192≤k<−128
−j if −128≤k<−64
−j if −64≤k<0
1 if 0≤k<64
1 if 64≤k<128
−1 if 128≤k<192
−1 if 192≤k<256
j if 256≤k<320
j if 320≤k<384
−j if 384≤k<448
−j if 448≤k<512
or
Gamma_k,320=1 if k<−448
1 if −448≤k<−384
−1 if −384≤k<−320
−1 if −320≤k<−256
−j if −256≤k<−192
−j if −192≤k<−128
j if −128≤k<−64
j if −64≤k<0
1 if 0≤k<64
1 if 64≤k<128
−1 if 128≤k<192
−1 if 192≤k<256
−j if 256≤k<320
−j if 320≤k<384 j if 384≤k<448
j if 448≤k<512

TABLE 29

| L-STF | L-LTF |
|---|---|
| 9.3305 | 9.8624 |

Gamma_k,320=1 if k<−448 −1 if −448≤k<−384
−1 if −384≤k<−320
1 if −320≤k<−256
j if −256≤k<−192
−j if −192≤k<−128
−j if −128≤k<−64
j if −64≤k<0
1 if 0≤k<64
−1 if 64≤k<128
−1 if 128≤k<192
1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
−j if −256≤k<−192
j if −192≤k<−128
j if −128≤k<−64
−j if −64≤k<0
1 if 0≤k<64
−1 if 64≤k<128
−1 if 128≤k<192
1 if 192≤k<256
−j if 256≤k<320
j if 320≤k<384
j if 384≤k<448
−j if 448≤k<512

TABLE 30

| L-STF | L-LTF |
|---|---|
| 9.3515 | 9.9455 |

Gamma_k,320=1 if k<−448 j if −448≤k<−384
1 if −384≤k<−320
j if −320≤k<−256
−j if −256≤k<−192
1 if −192≤k<−128
−j if −128≤k<−64
1 if −64≤k<0
1 if 0≤k<64
j if 64≤k<128
1 if 128≤k<192
j if 192≤k<256
−j if 256≤k<320
1 if 320≤k<384
−j if 384≤k<448
1 if 448≤k<512

TABLE 31

| L-STF | L-LTF |
|---|---|
| 8.8825 | 10.2567 |

Gamma_k,320=1 if k<−448 −j if −448≤k<−384
1 if −384≤k<−320
−j if −320≤k<−256
j if −256≤k<−192
1 if −192≤k<−128
j if −128≤k<−64
1 if −64≤k<0
1 if 0≤k<64
−j if 64≤k<128
1 if 128≤k<192
−j if 192≤k<256
j if 256≤k<320
1 if 320≤k<384
j if 384≤k<448
1 if 448≤k<512

TABLE 32

| L-STF | L-LTF |
|---|---|
| 8.8825 | 10.2567 |

Gamma_k,320=1 if k<−448 −1 if −448≤k<−384
−1 if −384≤k<−320
−1 if −320≤k<−256
1 if −256≤k<−192
−1 if −192≤k<−128
−1 if −128≤k<−64
−1 if −64≤k<0
−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 33

| L-STF | L-LTF |
|---|---|
| 7.7653 | 8.4095 |

A subcarrier index may be calibrated and also applied to a non-contiguous 320 MHz. And, in the equation presented above, the phase rotation of −512≤k<−256 may be applied to the 80 MHz having a lowest frequency, the phase rotation of −256≤k<0 may be applied to the 80 MHz having a second lowest frequency, the phase rotation of 0≤k<256 may be applied to the 80 MHz having a third lowest frequency, and the phase rotation of 256≤k<512 may be applied to the 80 MHz having a highest frequency. In light of unifying the phase rotation of the contiguous/non-contiguous 320 MHz and the overall packet, the eighth group or ninth group of phase rotations, which minimizes the PAPR of the L-LTF having the greater PAPR value, may be preferred.

3) Repeat 160 MHz Phase Rotation

In this method, by repeating the 160 MHz phase rotation (the phase rotation proposed in B) two times, and in a situation where a contiguous 320 MHz packet is transmitted by using one RF, and in a situation where a contiguous/non-contiguous 320 MHz packet is transmitted for each 80 MHz by using multiple RFs, the phase rotation may be unified. The contiguous 320 MHz may be expressed as shown below, and the maximum PAPR is also as shown below.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
1 if 0≤k<64
j if 64≤k<128
1 if 128≤k<192
j if 192≤k<256
−j if 256≤k<320
−1 if 320≤k<384
−j if 384≤k<448
−1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
1 if 0≤k<64
−j if 64≤k<128
1 if 128≤k<192
−j if 192≤k<256
j if 256≤k<320
−1 if 320≤k<384
j if 384≤k<448
−1 if 448≤k<512

TABLE 34

| L-STF | L-LTF |
|---|---|
| 10.7332 | 12.1712 |

Gamma_k,320=1 if k<−448 1 if −448≤k<−384
−1 if −384≤k<−320
−1 if −320≤k<−256
−j if −256≤k<−192
j if −192≤k<−128
j if −128≤k<−64
−j if −64≤k<0
1 if 0≤k<64
1 if 64≤k<128
−1 if 128≤k<192
−1 if 192≤k<256
−j if 256≤k<320
j if 320≤k<384
j if 384≤k<448
−j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
1 if 0≤k<64
1 if 64≤k<128
−1 if 128≤k<192
−1 if 192≤k<256
j if 256≤k<320
−j if 320≤k<384
−j if 384≤k<448
j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
1 if 0≤k<64
−1 if 64≤k<128
−1 if 128≤k<192
1 if 192≤k<256
j if 256≤k<320
j if 320≤k<384
−j if 384≤k<448
−j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
1 if 0≤k<64
−1 if 64≤k<128
−1 if 128≤k<192
1 if 192≤k<256
−j if 256≤k<320
−j if 320≤k<384
j if 384≤k<448
j if 448≤k<512

TABLE 35

| L-STF | L-LTF |
|---|---|
| 11.2703 | 11.8144 |

Gamma_k,320=1 if k<−448-1 if −448≤k<−384
−1 if −384≤k<−320
−1 if −320≤k<−256
1 if −256≤k<−192
−1 if −192≤k<−128
−1 if −128≤k<−64
−1 if −64≤k<0
1 if 0≤k<64
−1 if 64≤k<128
−1 if 128≤k<192
−1 if 192≤k<256
1 if 256≤k<320
−1 if 320≤k<384
−1 if 384≤k<448
−1 if 448≤k<512

TABLE 36

| L-STF | L-LTF |
|---|---|
| 8.2600 | 9.1864 |

Gamma_k,320=1 if k<−448 1 if −448≤k<−384
−1 if −384≤k<−320
−1 if −320≤k<−256
1 if −256≤k<−192
1 if −192≤k<−128
−1 if −128≤k<−64
−1 if −64≤k<0
1 if 0≤k<64
1 if 64≤k<128
−1 if 128≤k<192
−1 if 192≤k<256
1 if 256≤k<320
1 if 320≤k<384
−1 if 384≤k<448
−1 if 448≤k<512

TABLE 37

| L-STF | L-LTF |
|---|---|
| 11.2703 | 11.8144 |

Gamma_k,320=1 if k<−448 −1 if −448≤k<−384
−1 if −384≤k<−320
1 if −320≤k<−256
1 if −256≤k<−192
−1 if −192≤k<−128
−1 if −128≤k<−64
1 if −64≤k<0
1 if 0≤k<64
−1 if 64≤k<128
−1 if 128≤k<192
1 if 192≤k<256
1 if 256≤k<320
−1 if 320≤k<384
−1 if 384≤k<448
1 if 448≤k<512

TABLE 38

| L-STF | L-LTF |
|---|---|
| 11.2703 | 11.8144 |

Gamma_k,320=1 if k<−448 j if −448≤k<−384
1 if −384≤k<−320
j if −320≤k<−256
1 if −256≤k<−192
j if −192≤k<−128
1 if −128≤k<−64
j if −64≤k<0
1 if 0≤k<64
j if 64≤k<128
1 if 128≤k<192
j if 192≤k<256
1 if 256≤k<320
j if 320≤k<384
1 if 384≤k<448
j if 448≤k<512

TABLE 39

| L-STF | L-LTF |
|---|---|
| 11.1203 | 12.1967 |

Gamma_k,320=1 if k<−448 −j it −448≤k<−384
1 if −384≤k<−320
−j if −320≤k<−256
1 if −256≤k<−192
−j if −192≤k<−128
1 if −128≤k<−64
−j if −64≤k<0
1 if 0≤k<64
−j if 64≤k<128
1 if 128≤k<192
−j if 192≤k<256
1 if 256≤k<320
−j if 320≤k<384
1 if 384≤k<448
−j if 448≤k<512

TABLE 40

| L-STF | L-LTF |
|---|---|
| 11.1203 | 12.1967 |

Gamma_k,320=1 if k<−448 −1 if −448≤k<−384
−1 if −384≤k<−320
−1 if −320≤k<−256
−1 if −256≤k<−192
1 if −192≤k<−128
1 if −128≤k<−64
1 if −64≤k<0
1 if 0≤k<64
−1 if 64≤k<128
−1 if 128≤k<192
−1 if 192≤k<256
−1 if 256≤k<320
1 if 320≤k<384
1 if 384≤k<448
1 if 448≤k<512

TABLE 41

| L-STF | L-LTF |
|---|---|
| 10.3686 | 11.4168 |

A subcarrier index may be calibrated and also applied to any form of non-contiguous 320 MHz. And, in the equation presented above, the phase rotation of −512≤k<−256 may be applied to the 80 MHz having a lowest frequency, the phase rotation of −256≤k<0 may be applied to the 80 MHz having a second lowest frequency, the phase rotation of 0≤k<256 may be applied to the 80 MHz having a third lowest frequency, and the phase rotation of 256≤k<512 may be applied to the 80 MHz having a highest frequency. However, the PAPR is not always good in all cases. The simple repetition of the phase rotation that is presented in the above-described various proposals has a relatively poor PAPR as compared to the following proposal of 4). And, therefore, the proposals presented above may not be preferable.

4) Repeat 160 MHz Phase Rotation and Add Phase Rotation in 160 MHz Bandwidth Units In this method, by repeating the 160 MHz phase rotation (the phase rotation proposed in B) two times, and by additionally applying phase rotation in each 160 MHz unit, the PAPR may be more optimized. In this method, since the 160 MHz unit is maintained, the phase rotation may also be unified in a situation where a contiguous 320 MHz packet is transmitted by using one RF, and in a situation where a contiguous/non-contiguous 320 MHz packet is transmitted for each 80 MHz by using two RFs.

The following indicates a phase rotation having the phase rotation being optimized in 160 MHz bandwidth units added thereto in L-STF and L-LTF and the PAPR.

Gamma_k,320=1 if k<−448
j if −448≤k<−384
1 if −384≤k<−320
j if −320≤k<−256
−j if −256≤k<−192
−1 if −192≤k<−128
−j if −128≤k<−64
−1 if −64≤k<0
−1 if 0≤k<64
−j if 64≤k<128
−1 if 128≤k<192
−j if 192≤k<256
j if 256≤k<320
1 if 320≤k<384
j if 384≤k<448
1 if 448≤k<512
or
Gamma_k,320=1 if k<−448
−j if −448≤k<−384
1 if −384≤k<−320
−j if −320≤k<−256
j if −256≤k<−192
−1 if −192≤k<−128
j if −128≤k<−64
−1 if −64≤k<0
−1 if 0≤k<64
j if 64≤k<128
−1 if 128≤k<192
j if 192≤k<256
−j if 256≤k<320
1 if 320≤k<384
−j if 384≤k<448
1 if 448≤k<512

TABLE 42

| L-STF | L-LTF |
|---|---|
| 8.8322 | 9.9083 |

Gamma_k,320=1 if k<−448 1 if −448≤k<−384
−1 if −384≤k<−320
−1 if −320≤k<−256
−j if −256≤k<−192
j if −192≤k<−128
j if −128≤k<−64
−j if −64≤k<0
−1 if 0≤k<64
−1 if 64≤k<128
1 if 128≤k<192
1 if 192≤k<256
j if 256≤k<320
−j if 320≤k<384
−j if 384≤k<448
j if 448≤k<512
or
Gamma_k,320=1 if k<−448
1 if −448≤k<−384
−1 if −384≤k<−320
−1 if −320≤k<−256
j if −256≤k<−192
−j if −192≤k<−128
−j if −128≤k<−64
j if −64≤k<0
−1 if 0≤k<64
−1 if 64≤k<128
1 if 128≤k<192
1 if 192≤k<256
−j if 256≤k<320
j if 320≤k<384
j if 384≤k<448
−j if 448≤k<512
or
Gamma_k,320=1 if k<−448
−1 if −448≤k<−384
−1 if −384≤k<−320
1 if −320≤k<−256
j if −256≤k<−192
j if −192≤k<−128
−j if −128≤k<−64
−j if −64≤k<0
−1 if 0≤k<64
1 if 64≤k<128
1 if 128≤k<192
−1 if 192≤k<256
−j if 256≤k<320
−j if 320≤k<384
j if 384≤k<448
j if 448≤k<512
or
Gamma_k,320=1 if k<−448
−1 if −448≤k<−384
−1 if −384≤k<−320
1 if −320≤k<−256
−j if −256≤k<−192
−j if −192≤k<−128
j if −128≤k<−64
j if −64≤k<0
−1 if 0≤k<64
1 if 64≤k<128
1 if 128≤k<192
−1 if 192≤k<256
j if 256≤k<320
j if 320≤k<384
−j if 384≤k<448
−j if 448≤k<512

TABLE 43

| L-STF | L-LTF |
|---|---|
| 8.9784 | 9.7256 |

Gamma_k,320=1 if k<−448-1 if −448≤k<−384
−1 if −384≤k<−320
−1 if −320≤k<−256
1 if −256≤k<−192
−1 if −192≤k<−128
−1 if −128≤k<−64
−1 if −64≤k<0

−1 if 0≤k<64
1 if 64≤k<128
1 if 128≤k<192
1 if 192≤k<256
−1 if 256≤k<320
1 if 320≤k<384
1 if 384≤k<448
1 if 448≤k<512

TABLE 44

| L-STF | L-LTF |
|---|---|
| 7.7653 | 8.4095 |

Gamma_k,320=1 if k<−448 1 if −448≤k<−384
−1 if −384≤k<−320
−1 if −320≤k<−256
1 if −256≤k<−192
1 if −192≤k<−128
−1 if −128≤k<−64
−1 if −64≤k<0
−1 if 0≤k<64
−1 if 64≤k<128
1 if 128≤k<192
1 if 192≤k<256
−1 if 256≤k<320
−1 if 320≤k<384
1 if 384≤k<448
1 if 448≤k<512

TABLE 45

| L-STF | L-LTF |
|---|---|
| 9.6486 | 10.2928 |

Gamma_k,320=1 if k<−448-1 if −448≤k<−384
−1 if −384≤k<−320
1 if −320≤k<−256
1 if −256≤k<−192
−1 if −192≤k<−128
−1 if −128≤k<−64
1 if −64≤k<0
−1 if 0≤k<64
1 if 64≤k<128
1 if 128≤k<192
−1 if 192≤k<256
−1 if 256≤k<320
1 if 320≤k<384
1 if 384≤k<448
−1 if 448≤k<512

TABLE 46

| L-STF | L-LTF |
|---|---|
| 9.7113 | 10.4069 |

Gamma_k,320=1 if k<−448 j if −448≤k<−384
1 if −384≤k<−320
j if −320≤k<−256
1 if −256≤k<−192
j if −192≤k<−128
1 if −128≤k<−64
j if −64≤k<0
−1 if 0≤k<64
−j if 64≤k<128
−1 if 128≤k<192
−j if 192≤k<256
−1 if 256≤k<320
−j if 320≤k<384
−1 if 384≤k<448
−j if 448≤k<512

TABLE 47

| L-STF | L-LTF |
|---|---|
| 9.5624 | 10.6415 |

Gamma_k,320=1 if k<−448 −j if −448≤k<−384
1 if −384≤k<−320
−j if −320≤k<−256
1 if −256≤k<−192
−j if −192≤k<−128
1 if −128≤k<−64
−j if −64≤k<0
−1 if 0≤k<64
j if 64≤k<128
−1 if 128≤k<192
j if 192≤k<256
−1 if 256≤k<320
j if 320≤k<384
−1 if 384≤k<448
j if 448≤k<512

TABLE 48

| L-STF | L-LTF |
|---|---|
| 9.5624 | 10.6415 |

Gamma_k,320=1 if k<−448-1 if −448≤k<−384
−1 if −384≤k<−320
−1 if −320≤k<−256
−1 if −256≤k<−192
1 if −192≤k<−128
1 if −128≤k<−64
1 if −64≤k<0
−1 if 0≤k<64
1 if 64≤k<128
1 if 128≤k<192
1 if 192≤k<256
1 if 256≤k<320
−1 if 320≤k<384
−1 if 384≤k<448
−1 if 448≤k<512

TABLE 49

| L-STF | L-LTF |
|---|---|
| 8.2391 | 9.0612 |

A subcarrier index may be calibrated and also applied to any form of non-contiguous 320 MHz. And, in the equation presented above, the phase rotation of −512≤k<−256 may be applied to the 80 MHz having a lowest frequency, the phase rotation of −256≤k<0 may be applied to the 80 MHz having a second lowest frequency, the phase rotation of 0≤k<256 may be applied to the 80 MHz having a third lowest frequency, and the phase rotation of 256≤k<512 may be applied to the 80 MHz having a highest frequency. However, the PAPR is not always good in all cases. In case of transmitting a 160 MHz packet by using one RF, although there may be a gain in light of unifying the phase rotation of the contiguous/non-contiguous 320 MHz, in light of each of 80 MHz and 320 MHz, since the PAPR may not be good as compared to the proposals of D. 2), this method may not be preferable.

A same value may be multiplied to the phase rotation value, which is proposed above, and then used (e.g., 1 or −1 or j or −j may be multiplied and used), or the order may be changed and used (e.g., the order may be changed to an order starting from a low frequency to a high frequency, and [1 −1 −1 −1 1 −1 −1 −1] may be used by being changed to [−1 −1 −1 1 −1 −1 −1 1]), or the order may be changed and the same value may be multiplied thereto and used (e.g., the order may be changed to an order starting from a low frequency to a high frequency, and [1 −1 −1 −1 1 −1 −1 −1] may have its order changed and then multiplied by −1 so that [1 1 1 −1 1 1 1 −1] can be used). And, in this case, the same PAPR is given.

Figure 21:
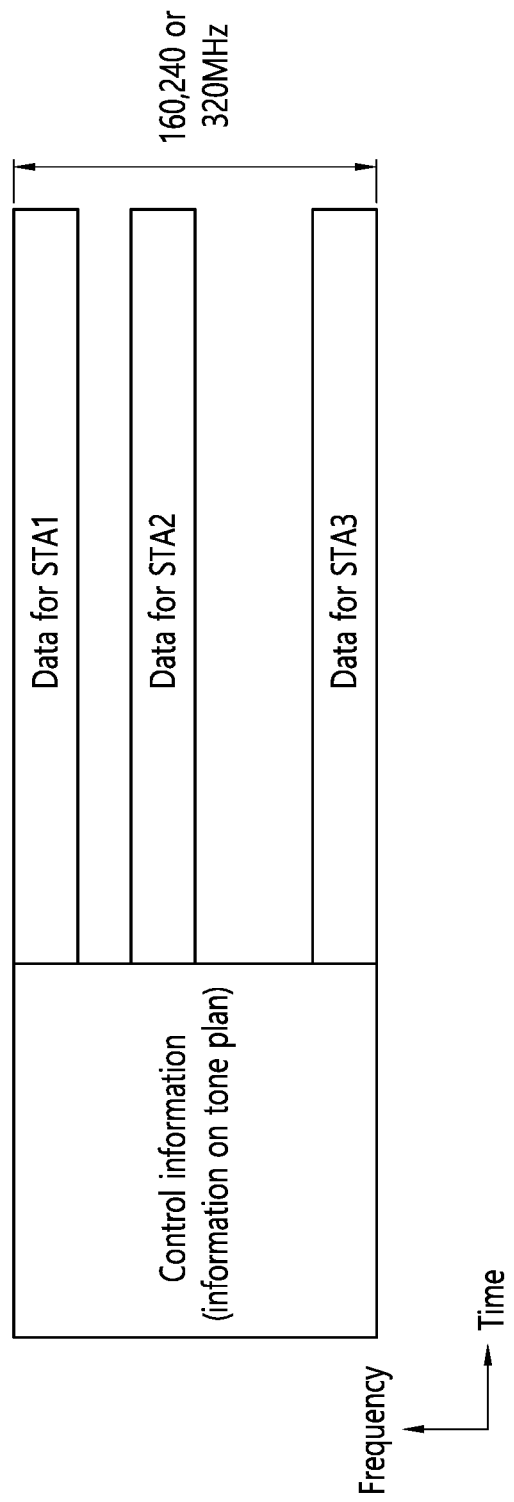
FIG. 21 shows exemplary OFDMA transmission in a 160 MHz, 240 MHz or 320 MHz band according to the present embodiment.

FIG. 21 shows exemplary OFDMA transmission in a 160 MHz, 240 MHz or 320 MHz band according to the present embodiment.

Referring to FIG. 21, an AP may transmit a PPDU to STA 1 to STA 3.

The PPDU may include control information including information on a tone plan. The STA 1 to STA 3 may transmit and receive data in RU units based on the information on the tone plan at 160 MHz, 240 MHz, or 320 MHz.

That is, the AP may transmit information on the tone plan to all STAs within the BSS at 160 MHz, 240 MHz, or 320 MHz, and the STA may obtain scheduling information of its data based on the information on the tone plan. Thus, among all the STAs within the BSS, STA 1 to STA 3 having data may transmit and receive data through the allocated RU based on the information on the tone plan. The data may include both downlink data and uplink data.

Figure 22:
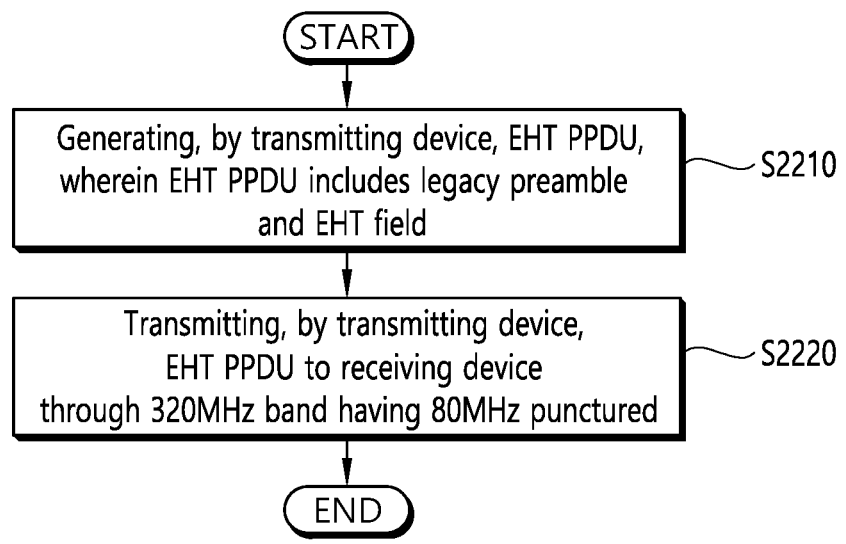
FIG. 22 is a flow chart showing a procedure for transmitting an EHT PPDU according to the present embodiment.

FIG. 22 is a flow chart showing a procedure for transmitting an EHT PPDU according to the present embodiment.

An example of FIG. 22 may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

An example of FIG. 22 may be performed by a transmitting device, and the transmitting device may correspond to an AP. A receiving device may correspond to an STA (non AP STA).

This embodiment relates to a method and device for transmitting a PPDU through 240, 320 MHz bands and configuring a phase rotation value being applied to a legacy preamble for a PAPR that is optimized in a case where 80 MHz-based preamble puncturing is performed in the band. The 80 MHz-based preamble puncturing means that a broadband is punctured in 80 MHz band units. Herein, however, the description will be limited only to the 320 MHz band.

In step S2210, a transmitting device generates the EHT Physical Protocol Data Unit (PPDU). The EHT PPDU includes a legacy preamble and an EHT field.

In step S2220, the transmitting device transmits the EHT PPDU to a receiving device through a 320 MHz band having 80 MHz punctured.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The legacy preamble is generated by applying a first phase rotation value. That is, all fields included in the legacy preamble may commonly have the first phase rotation value applied thereto. The first phase rotation value is a phase rotation value that is defined for optimal PAPRs of L-STF and L-LTF. That is, if the PAPRs of L-STF and L-LTF are great (or large), the first phase rotation value may be applied to the legacy preamble in order to minimize the PAPR values.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPR may be ensured for the transmission of 240 MHz/320 MHz bands having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 1+j 0 0 0 −1 −j 0 0 0 1 +j 0 0 0 −1 −j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 −1 1 −1 1 1 1 1 0 0 0 0 0].

In the above-described embodiment, even when the PPDU is being transmitted through a 240 MHz band, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 160/240/320 MHz through the EHT-SIG-B within the PPDU. Additionally, EHT-STF, EHT-LTF, and data field being included in the EHT field may be transmitted and/or received from/in a band (RU) according to a tone plan at 160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

Figure 23:
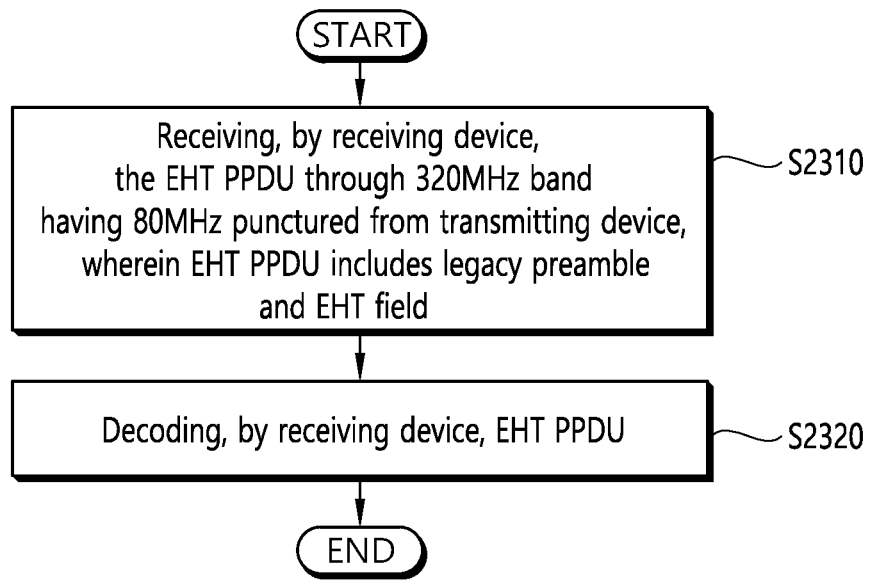
FIG. 23 is a flow chart showing a procedure for receiving an EHT PPDU according to the present embodiment.

FIG. 23 is a flow chart showing a procedure for receiving an EHT PPDU according to the present embodiment.

An example of FIG. 23 may be performed in a network environment being supported by a next generation wireless LAN system. The next generation wireless LAN system is an enhanced version of the 802.11ax system, which can satisfy backward compatibility with the 802.11ax system. The next generation wireless LAN system may also correspond to an Extreme High Throughput (EHT) wireless LAN system or an 802.11be wireless LAN system.

The example of FIG. 23 may be performed by a receiving device, and the receiving device may correspond to an STA (non AP STA). A transmitting device may correspond to an AP.

This embodiment relates to a method and device for transmitting a PPDU through 240, 320 MHz bands and configuring a phase rotation value being applied to a legacy preamble for a PAPR that is optimized in a case where 80 MHz-based preamble puncturing is performed in the band. The 80 MHz-based preamble puncturing means that a broadband is punctured in 80 MHz band units. Herein, however, the description will be limited only to the 320 MHz band.

In step S2310, the receiving device receives the EHT PPDU through a 320 MHz band having 80 MHz punctured from a transmitting device. The EHT PPDU includes a legacy preamble and an EHT field.

In step S2320, the receiving device decodes the EHT PPDU.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The legacy preamble is generated by applying a first phase rotation value. That is, all fields included in the legacy preamble may commonly have the first phase rotation value applied thereto. The first phase rotation value is a phase rotation value that is defined for optimal PAPRs of L-STF and L-LTF. That is, if the PAPRs of L-STF and L-LTF are great (or large), the first phase rotation value may be applied to the legacy preamble in order to minimize the PAPR values.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPR may be ensured for the transmission of 240 MHz/320 MHz bands having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt($\frac{1}{2}$)*[0 0 0 0 0 0 0 1 +j 0 0 0 −1 −j 0 0 0 1 +j 0 0 0 −1 −j 0 0 0 −1 −j 0 0 0 1 +j 0 0 0 0 0 0 −1 −j 0 0 0 −1 −j 0 0 0 1 +j 0 0 0 1 +j 0 0 0 1 +j 0 0 0 1 +j 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 −1 1 1 −1 −1 1 1 −1 1 −1 1 1 1 1 0 0 0 0 0].

In the above-described embodiment, even when the PPDU is being transmitted through a 240 MHz band, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 160/240/320 MHz through the EHT-SIG-B within the PPDU. Additionally, EHT-STF, EHT-LTF, and data field being included in the EHT field may be transmitted and/or received from/in a band (RU) according to a tone plan at 160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

5. Device Configuration

Figure 24:
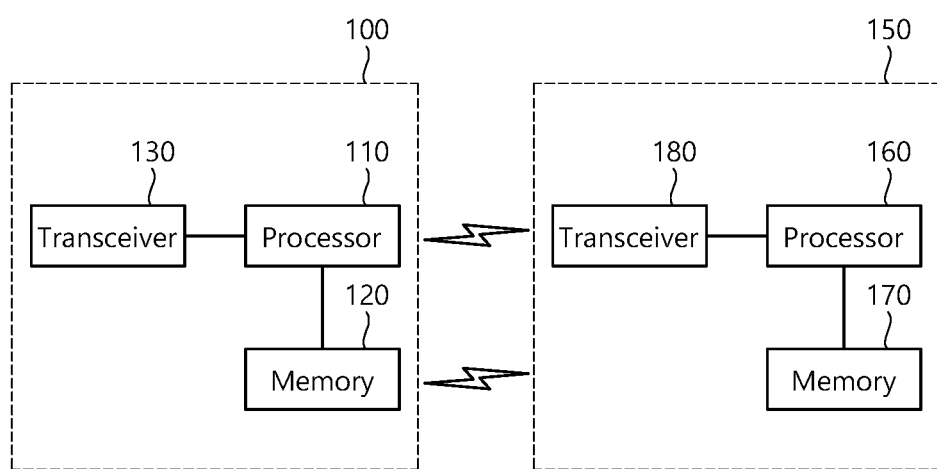
FIG. 24 is a diagram for describing a device for implementing the above-described method.

FIG. 24 is a diagram for describing a device for implementing the above-described method.

A wireless device (100) of FIG. 24 is a transmitting device that can implement the above-described embodiment and may be operated as an AP STA. A wireless device (150) of FIG. 24 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Operations of a processor (110) of the transmitting device will be described in detail as follows. The processor (110) of the transmitting device generates an EHT PPDU and transmits the EHT PPDU through a 240/320 MHz band having 80 MHz band punctured.

Operations of a processor (160) of the receiving device will be described in detail as follows. The processor (160) of the receiving device receives a generated EHT PPDU from a transmitting device through a 240/320 MHz band having 80 MHz band punctured, and decodes the EHT PPDU for a band that is supported by the receiving device.

Figure 25:
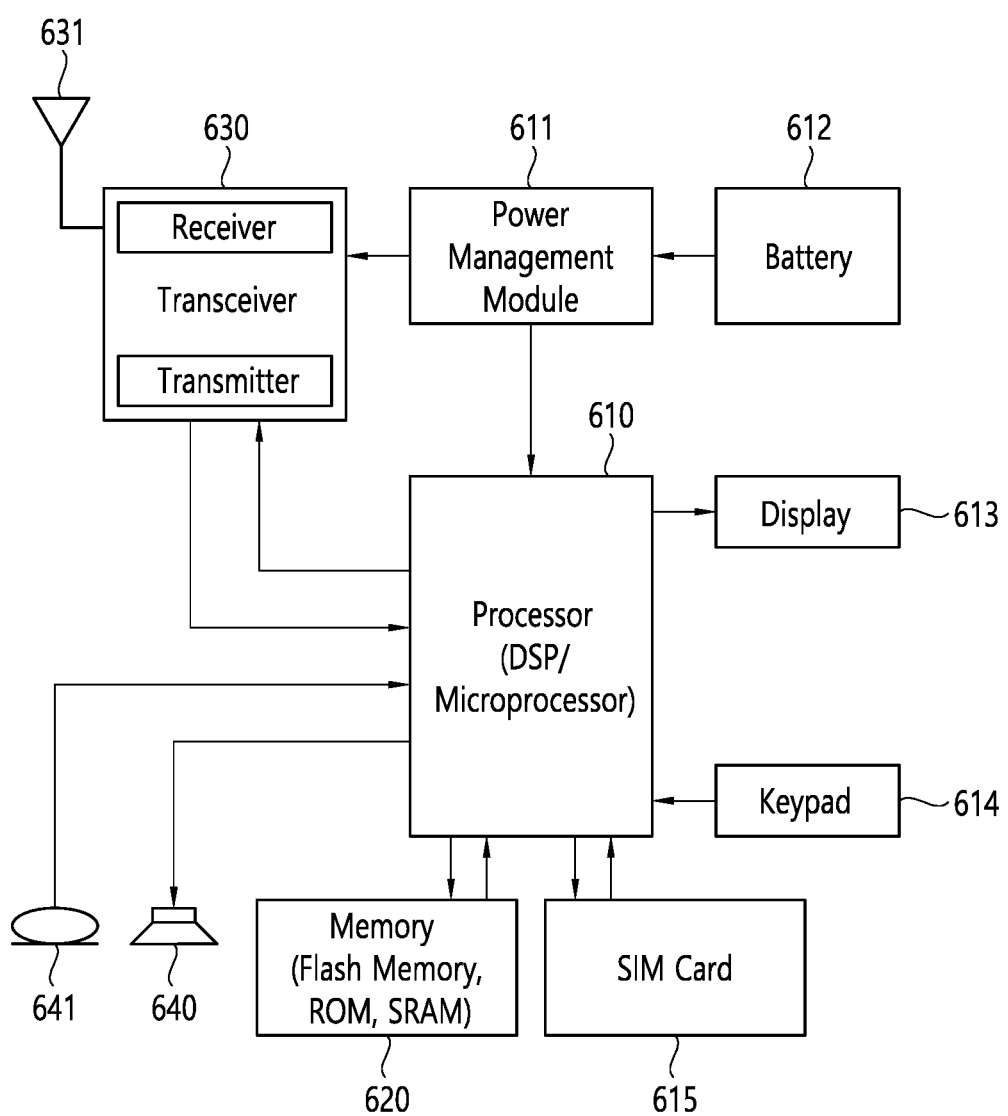
FIG. 25 shows a UE to which the technical features of the present disclosure can be applied.

FIG. 25 shows a UE to which the technical features of the present disclosure can be applied.

A UE includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may be configured to control one or more other components of the UE (600) to implement proposed functions, procedures and/or methods of the present disclosure described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting device, the processor (610) generates an EHT PPDU and transmits the EHT PPDU through a 240/320 MHz band having 80 MHz band punctured.

In case of a receiving device, the processor (610) receives a generated EHT PPDU from a transmitting device through a 240/320 MHz band having 80 MHz band punctured, and decodes the EHT PPDU for a band that is supported by the receiving device.

The legacy preamble includes a Legacy-Short Training Field (L-STF) and a Legacy-Long Training Field (L-LTF). Additionally, the legacy preamble may further include a Legacy-Signal (L-SIG). The EHT field may include EHT-SIG, EHT-STF, EHT-LTF, and a data field. The legacy field may be a field that is supported by a wireless LAN system preceding 802.11be, and the EHT field may be a field that is supported by an 802.11be wireless LAN system.

The legacy preamble is generated by applying a first phase rotation value. That is, all fields included in the legacy preamble may commonly have the first phase rotation value applied thereto. The first phase rotation value is a phase rotation value that is defined for optimal PAPRs of L-STF and L-LTF. That is, if the PAPRs of L-STF and L-LTF are great (or large), the first phase rotation value may be applied to the legacy preamble in order to minimize the PAPR values.

The first phase rotation value is obtained based on a second phase rotation value and a third phase rotation value.

The second phase rotation value is a phase rotation value obtained by repeating a phase rotation value that is defined for an 80 MHz band in an 802.11ax system. Since the EHT PPDU is transmitted through the 320 MHz band, the second phase rotation value may be obtained by repeating four times the phase rotation value of the 80 MHz band, which optimizes the PAPRs in the L-STF and L-LTF and is applied in 20 MHz band units. If the PPDU is said to be transmitted through a 160 MHz band, the second phase rotation value may be obtained by repeating two times the phase rotation value of the 80 MHz band (optimizing the PAPRs in the L-STF and L-LTF and being applied in 20 MHz band units). And, if the PPDU is said to be transmitted through a 240 MHz band, the second phase rotation value may be obtained by repeating three times the phase rotation value (optimizing the PAPRs in the L-STF and L-LTF and being applied in 20 MHz band units).

The third phase rotation value is a phase rotation value being defined in 80 MHz band units in the 320 MHz band based on optimal PAPRs of the L-STF and the L-LTF. Since the 320 MHz band may be divided into 4 units of 80 MHz band, a third phase rotation value may be defined for each of the four 80 MHz bands. If the EHT PPDU is said to be transmitted through a 160 MHz band, a third phase rotation value may be defined for each of two 80 MHz bands, based on the optimal PAPRs of the L-STF and the L-LTF. If the EHT PPDU is said to be transmitted through a 240 MHz band, a third phase rotation value may be defined for each of three 80 MHz bands, based on the optimal PAPRs of the L-STF and the L-LTF.

That is, this embodiment proposes a method for additionally performing phase rotation (the third phase rotation value) for each 80 MHz band unit within a full band while applying a phase rotation value (the second phase rotation value) being defined for the 80 MHz band.

Hereinafter, a subcarrier range having the phase rotation value applied thereto will be described.

The 320 MHz is configured of subcarriers having subcarrier indexes from −512 to 511.

The second rotation phase value is [1 −1 −1 −1 1 −1 −1 −1 1 −1 −1 −1 1 −1 −1 −1]. This is because the rotation phase value being defined for the 80 MHz band has been repeated 4 times.

Among the second rotation phase value, a first value 1 may be applied to a subcarrier having subcarrier indexes from −512 to −449, among the second rotation phase value, a second value −1 may be applied to a subcarrier having subcarrier indexes from −448 to −385, among the second rotation phase value, a third value −1 may be applied to a subcarrier having subcarrier indexes from −384 to −321, and, among the second rotation phase value, a fourth value −1 may be applied to a subcarrier having subcarrier indexes from −320 to −257. That is, [1 −1 −1 −1] being the first to fourth values of the second rotation phase value may be applied to a first 80 MHz band within the 320 MHz band.

Among the second rotation phase value, a fifth value 1 may be applied to a subcarrier having subcarrier indexes from −256 to −193, among the second rotation phase value, a sixth value −1 may be applied to a subcarrier having subcarrier indexes from −192 to −129, among the second rotation phase value, a seventh value −1 may be applied to a subcarrier having subcarrier indexes from −128 to −65, and, among the second rotation phase value, an eighth value −1 may be applied to a subcarrier having subcarrier indexes from −64 to −1. That is, [1 −1 −1 −1] being the fifth to eighth values of the second rotation phase value may be applied to a second 80 MHz band within the 320 MHz band.

Among the second rotation phase value, a ninth value 1 may be applied to a subcarrier having subcarrier indexes from 0 to 63, among the second rotation phase value, a tenth value −1 may be applied to a subcarrier having subcarrier indexes from 64 to 127, among the second rotation phase value, an eleventh value −1 may be applied to a subcarrier having subcarrier indexes from 128 to 191, and, among the second rotation phase value, a twelfth value −1 may be applied to a subcarrier having subcarrier indexes from 192 to 255. That is, [1 −1 −1 −1] being the ninth to twelfth values of the second rotation phase value may be applied to a third 80 MHz band within the 320 MHz band.

Among the second rotation phase value, a thirteenth value 1 may be applied to a subcarrier having subcarrier indexes from 256 to 319, among the second rotation phase value, a fourteenth value −1 may be applied to a subcarrier having subcarrier indexes from 320 to 383, among the second rotation phase value, a fifteenth value −1 may be applied to a subcarrier having subcarrier indexes from 384 to 447, and, among the second rotation phase value, a sixteenth value −1 may be applied to a subcarrier having subcarrier indexes from 448 to 511. That is, [1 −1 −1 −1] being the thirteenth to sixteenth values of the second rotation phase value may be applied to a fourth 80 MHz band within the 320 MHz band.

For example, the third phase rotation value may be [1 1 −1 −1]. Since the 320 MHz band may be divided into 4 units of 80 MHz band, a third phase rotation value may be defined for each of the four 80 MHz bands.

Among the third rotation phase value, a first value 1 may be applied to a first 80 MHz band within the 320 MHz band, among the third rotation phase value, a second value 1 may be applied to a second 80 MHz band within the 320 MHz band, among the third rotation phase value, a third value −1 may be applied to a third 80 MHz band within the 320 MHz band, and, among the third rotation phase value, a fourth value −1 may be applied to a fourth 80 MHz band within the 320 MHz band.

The first phase rotation value may be obtained based on a multiplication of the second phase rotation value and the third phase rotation value. That is, the first phase rotation value may be obtained by multiplying the second phase rotation value and the third phase rotation value to align with the frequency band (or subcarrier index). At this point, the first phase rotation value is [1 −1 −1 −1 1 −1 −1 −1 −1 1 1 1 −1 1 1 1]. By applying the first phase rotation value to the legacy preamble, optimal PAPR may be ensured for the transmission of 240 MHz/320 MHz bands having 80 MHz-based preamble puncturing performed therein.

For example, the 80 MHz band may include all 80 MHz bands excluding a primary 80 MHz band. That is, although the primary 80 MHz band may always be used for the PPDU transmission, not all of the remaining 80 MHz bands may be used for the PPDU transmission. The first and second phase rotation values may be obtained based on a preamble puncturing pattern. The preamble puncturing pattern may be a band pattern having punctured at least one 80 MHz band, among all 80 MHz bands excluding the primary 80 MHz band within the 320 MHz band.

That is, the preamble puncturing pattern may correspond to a pattern of all cases having at least one 80 MHz band punctured in the 320 MHz band. However, the first phase rotation value has one unified form and not a form having various values according to the preamble puncturing pattern.

The L-STF may be generated by applying the first phase rotation value to an L-STF sequence. Additionally, the L-LTF may be generated by applying the first phase rotation value to an L-LTF sequence.

The L-STF sequence may be a sequence being configured by repeating an L-STF sequence that is defined for a 20 MHz band. Since the L-STF is transmitted through the 320 MHz band, the L-STF sequence may be obtained by repeating the L-STF sequence of the 20 MHz band, which is defined in the existing 802.11ax. Similarly, if the L-STF is transmitted through a 160 MHz band, the L-STF sequence of the 20 MHz band, which is defined in the existing 802.11ax, may be repeated two times. And, if the L-STF is transmitted through a 240 MHz band, the L-STF sequence of the 20 MHz band, which is defined in the existing 802.11ax, may be repeated three times.

The L-STF sequence being defined for the 20 MHz band is sqrt(½)*[0 0 0 0 0 0 0 1 +j 0 0 0 −1 −j 0 0 0 1 +j 0 0 0 −1 −j 0 0 0 −1 −j 0 0 0 1 +j 0 0 0 0 0 0 −1 −j 0 0 0 −1 −j 0 0 0 1 +j 0 0 0 1 +j 0 0 0 1 +j 0 0 0 1 +j 0 0 0 0 0 0 0].

The L-LTF sequence may be a sequence being configured by repeating an L-LTF sequence that is defined for a 20 MHz band. Since the L-LTF is transmitted through the 320 MHz band, the L-LTF sequence may be obtained by repeating the L-LTF sequence of the 20 MHz band, which is defined in the existing 802.11ax. Similarly, if the L-LTF is transmitted through a 160 MHz band, the L-LTF sequence of the 20 MHz band, which is defined in the existing 802.11ax, may be repeated two times. And, if the L-LTF is transmitted through a 240 MHz band, the L-LTF sequence of the 20 MHz band, which is defined in the existing 802.11ax, may be repeated three times.

The L-LTF sequence being defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 −1 −1 −1 −1 −1 1 1 −1 −1 1 1 −1 1 −1 1 1 1 1 1 0 0 0 0 0].

In the above-described embodiment, even when the PPDU is being transmitted through a 240 MHz band, a phase rotation value may be defined and applied to the legacy preamble by using the same method.

The EHT-SIG may include EHT-SIG-A and EHT-SIG-B. The EHT-SIG-B may include the RU information. That is, an AP may notify information on a tone plan at 160/240/320 MHz through the EHT-SIG-B within the PPDU. Additionally, EHT-STF, EHT-LTF, and data field being included in the EHT field may be transmitted and/or received from/in a band (RU) according to a tone plan at 160/240/320 MHz.

Additionally, the EHT-SIG may be generated by applying the first phase rotation value or the second phase rotation value. If an EHT PPDU has a preamble structure, such as that of 11ax, a field may be generated by applying a phase rotation value that even has the same EHT-SIG-B.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method for transmitting an Extreme High Throughput (EHT) Physical Protocol Data Unit (PPDU) in a wireless LAN system, the method comprising:

generating, by a transmitting device, the EHT PPDU, wherein the EHT PPDU includes a legacy preamble and an EHT field; and transmitting, by the transmitting device, the EHT PPDU to a receiving device through a 320 MHz band having 80 MHz punctured, wherein the legacy preamble includes a Legacy-Short Training Field (L-STF) and a Legacy-Long Training Field (L-LTF), wherein the legacy preamble is generated by applying a first phase rotation value for a 320 MHz band, wherein the first phase rotation value is [1 −1 −1 −1 1 −1 −1 −1 −1 1 1 1 −1 1 1 1], and wherein the 320 MHz band is configured of subcarriers having subcarrier indexes from −512 to 511, wherein the L-STF is generated by applying the first phase rotation value to an L-STF sequence, wherein the L-STF sequence is configured by repeating an L-STF sequence defined for a 20 MHz band, wherein the L-STF sequence defined for the 20 MHz band is sqrt(½)*[0 0 0 0 0 0 0 0 1 +j 0 0 0 −1−j 0 0 0 1 +j 0 0 0 −1−j 0 0 0 −1 −j 0 0 0 1 +j 0 0 0 0 0 0 0 −1 −j 0 0 0 −1 −j 0 0 0 1 +j 0 0 0 1 +j 0 0 0 1 +j 0 0 0 1 +j 0 0 0 0 0 0 0], wherein the L-LTF is generated by applying the first phase rotation value to an L-LTF sequence, wherein the L-LTF sequence is configured by repeating an L-LTF sequence defined for a 20 MHz band, and wherein the L-LTF sequence defined for the 20 MHz band is [0 0 0 0 0 0 1 1 −1 −1 1 1 −1 1 −1 1 1 1 1 1 1 −1 −1 1 1 1 −1 1 −1 1 1 1 1 0 1 −1 −1 1 1 1 −1 1 −1 1 −1 1 −1 1 −1 −1 −1 −1 −1 1 1 −1 −1 1 −1 1 −1 1 1 1 1 0 0 0 0 0].

2. The method of claim 1, wherein the first phase rotation value is obtained based on a second phase rotation value and a third phase rotation value, wherein the second phase rotation value is a phase rotation value obtained by repeating a phase rotation value that is defined for an 80 MHz band in an 802.11ax system, wherein the third phase rotation value is a phase rotation value being defined in 80 MHz band units in the 320 MHz band based on optimal PAPRs of the L-STF and the L-LTF, wherein the second rotation phase value is [1 −1 −1 −1 1 −1 −1 −1 −1 1 −1 −1 −1 1 −1 −1 −1], wherein, among the second rotation phase value, a first value 1 is applied to a subcarrier having subcarrier indexes from −512 to −449, wherein, among the second rotation phase value, a second value −1 is applied to a subcarrier having subcarrier indexes from −448 to −385, wherein, among the second rotation phase value, a third value −1 is applied to a subcarrier having subcarrier indexes from −384 to −321, wherein, among the second rotation phase value, a fourth value −1 is applied to a subcarrier having subcarrier indexes from −320 to −257, wherein, among the second rotation phase value, a fifth value 1 is applied to a subcarrier having subcarrier indexes from −256 to −193, wherein, among the second rotation phase value, a sixth value −1 is applied to a subcarrier having subcarrier indexes from −192 to −129, wherein, among the second rotation phase value, a seventh value −1 is applied to a subcarrier having subcarrier indexes from −128 to −65, wherein, among the second rotation phase value, an eighth value −1 is applied to a subcarrier having subcarrier indexes from −64 to −1, wherein, among the second rotation phase value, a ninth value 1 is applied to a subcarrier having subcarrier indexes from 0 to 63, wherein, among the second rotation phase value, a tenth value −1 is applied to a subcarrier having subcarrier indexes from 64 to 127, wherein, among the second rotation phase value, an eleventh value −1 is applied to a subcarrier having subcarrier indexes from 128 to 191, wherein, among the second rotation phase value, a twelfth value −1 is applied to a subcarrier having subcarrier indexes from 192 to 255, wherein, among the second rotation phase value, a thirteenth value 1 is applied to a subcarrier having subcarrier indexes from 256 to 319, wherein, among the second rotation phase value, a fourteenth value −1 is applied to a subcarrier having subcarrier indexes from 320 to 383, wherein, among the second rotation phase value, a fifteenth value −1 is applied to a subcarrier having subcarrier indexes from 384 to 447, and wherein, among the second rotation phase value, a sixteenth value −1 is applied to a subcarrier having subcarrier indexes from 448 to 511.

3. The method of claim 2, wherein the third phase rotation value is [1 1 −1 −1], wherein, among the third rotation phase value, a first value 1 is applied to a first 80 MHz band within the 320 MHz band, wherein, among the third rotation phase value, a second value 1 is applied to a second 80 MHz band within the 320 MHz band, wherein, among the third rotation phase value, a third value −1 is applied to a third 80 MHz band within the 320 MHz band, and wherein, among the third rotation phase value, a fourth value −1 is applied to a fourth 80 MHz band within the 320 MHz band.

4. The method of claim 3, wherein the first phase rotation value is obtained based on a multiplication of the second phase rotation value and the third phase rotation value.

5. The method of claim 1, wherein the 80 MHz band includes all 80 MHz bands excluding a primary 80 MHz band, and wherein the first phase rotation value is obtained based on a preamble puncturing pattern.

6. The method of claim 5, wherein the preamble puncturing pattern is a band pattern having punctured at least one 80 MHz band, among all 80 MHz bands excluding the primary 80 MHz band within the 320 MHz band.

7. A transmitting device for transmitting an Extreme High Throughput (EHT) Physical Protocol Data Unit (PPDU) in a wireless LAN system, the transmitting device comprising:
a memory;
a transceiver; and
a processor being operatively coupled to the memory and the transceiver,
wherein the processor is configured to:
generate the EHT PPDU, wherein the EHT PPDU includes a legacy preamble and an EHT field, and
transmit the EHT PPDU to a receiving device through a 320 MHz band having 80 MHz punctured,
wherein the legacy preamble includes a Legacy-Short Training Field (L-STF) and a Legacy-Long Training Field (L-LTF),
wherein the legacy preamble is generated by applying a first phase rotation value for a 320 MHz band,
wherein the first phase rotation value is [1 −1 −1 −1 1 −1 −1 −1 −1 1 1 1 −1 1 1 1], and
wherein the 320 MHz band is configured of subcarriers having subcarrier indexes from −512 to 511,
wherein the L-STF is generated by applying the first phase rotation value to an L-STF sequence,
wherein the L-STF sequence is configured by repeating an L-STF sequence defined for a 20 MHz band,
wherein the L-STF sequence defined for the 20 MHz band is sqrt(½)*[0 0 0 0 0 0 0 0 1 +j 0 0 0 −1−j 0 0 0 1 +j 0 0 0 -1-j 0 0 0 -1 -j 0 0 0 1 +j 0 0 0 0 0 0 0 -1 -j 0 0 0 -1 -j 0 0 0 1 +j 0 0 0 1 +j 0 0 0 1 +j 0 0 0 1 +j 0 0 0 0 0 0], wherein the L-LTF is generated by applying the first phase rotation value to an L-LTF sequence, wherein the L-LTF sequence is configured by repeating an L-LTF sequence defined for a 20 MHz band, and wherein the L-LTF sequence defined for the 20 MHz band is [0 0 0 0 0 0 1 1 -1 -1 1 1 -1 1 -1 1 1 1 1 1 1 -1 -1 1 1 1 -1 1 -1 1 1 1 1 0 1 -1 -1 1 1 -1 1 1 -1 1 -1 1 -1 -1 1 -1 -1 -1 1 1 1 -1 -1 1 1 -1 1 1 -1 1 1 1 1 0 0 0 0 0].

8. The transmitting device of claim 7, wherein the first phase rotation value is obtained based on a second phase rotation value and a third phase rotation value, wherein the second phase rotation value is a phase rotation value obtained by repeating a phase rotation value that is defined for an 80 MHz band in an 802.11ax system, wherein the third phase rotation value is a phase rotation value being defined in 80 MHz band units in the 320 MHz band based on optimal PAPRs of the L-STF and the L-LTF, wherein the second rotation phase value is [1 -1 -1 -1 1 -1 -1 -1 1 -1 -1 -1 1 -1 -1 -1], wherein, among the second rotation phase value, a first value 1 is applied to a subcarrier having subcarrier indexes from -512 to -449, wherein, among the second rotation phase value, a second value -1 is applied to a subcarrier having subcarrier indexes from -448 to -385, wherein, among the second rotation phase value, a third value -1 is applied to a subcarrier having subcarrier indexes from -384 to -321, wherein, among the second rotation phase value, a fourth value -1 is applied to a subcarrier having subcarrier indexes from -320 to -257, wherein, among the second rotation phase value, a fifth value 1 is applied to a subcarrier having subcarrier indexes from -256 to -193, wherein, among the second rotation phase value, a sixth value -1 is applied to a subcarrier having subcarrier indexes from -192 to -129, wherein, among the second rotation phase value, a seventh value -1 is applied to a subcarrier having subcarrier indexes from -128 to -65, wherein, among the second rotation phase value, an eighth value -1 is applied to a subcarrier having subcarrier indexes from -64 to -1, wherein, among the second rotation phase value, a ninth value 1 is applied to a subcarrier having subcarrier indexes from 0 to 63, wherein, among the second rotation phase value, a tenth value -1 is applied to a subcarrier having subcarrier indexes from 64 to 127, wherein, among the second rotation phase value, an eleventh value -1 is applied to a subcarrier having subcarrier indexes from 128 to 191, wherein, among the second rotation phase value, a twelfth value -1 is applied to a subcarrier having subcarrier indexes from 192 to 255, wherein, among the second rotation phase value, a thirteenth value 1 is applied to a subcarrier having subcarrier indexes from 256 to 319, wherein, among the second rotation phase value, a fourteenth value -1 is applied to a subcarrier having subcarrier indexes from 320 to 383, wherein, among the second rotation phase value, a fifteenth value -1 is applied to a subcarrier having subcarrier indexes from 384 to 447, and wherein, among the second rotation phase value, a sixteenth value -1 is applied to a subcarrier having subcarrier indexes from 448 to 511.

9. The transmitting device of claim 8, wherein the third phase rotation value is [1 1 -1 -1], wherein, among the third rotation phase value, a first value 1 is applied to a first 80 MHz band within the 320 MHz band, wherein, among the third rotation phase value, a second value 1 is applied to a second 80 MHz band within the 320 MHz band, wherein, among the third rotation phase value, a third value -1 is applied to a third 80 MHz band within the 320 MHz band, and wherein, among the third rotation phase value, a fourth value -1 is applied to a fourth 80 MHz band within the 320 MHz band.

10. The transmitting device of claim 9, wherein the first phase rotation value is obtained based on a multiplication of the second phase rotation value and the third phase rotation value.

11. The transmitting device of claim 7, wherein the 80 MHz band includes all 80 MHz bands excluding a primary 80 MHz band, and wherein the first phase rotation value is obtained based on a preamble puncturing pattern.

12. The transmitting device of claim 11, wherein the preamble puncturing pattern is a band pattern having punctured at least one 80 MHz band, among all 80 MHz bands excluding the primary 80 MHz band within the 320 MHz band.

13. A method for receiving an Extreme High Throughput (EHT) Physical Protocol Data Unit (PPDU) in a wireless LAN system, the method comprising:

receiving, by a receiving device, the EHT PPDU through a 320 MHz band having 80 MHz punctured from a transmitting device, wherein the EHT PPDU includes a legacy preamble and an EHT field; and decoding, by the receiving device, the EHT PPDU, wherein the legacy preamble includes a Legacy-Short Training Field (L-STF) and a Legacy-Long Training Field (L-LTF), wherein the legacy preamble is generated by applying a first phase rotation value for a 320 MHz band, wherein the first phase rotation value is [1 -1 -1 -1 1 -1 -1 -1 -1 1 1 1 -1 1 1 1], and wherein the 320 MHz band is configured of subcarriers having subcarrier indexes from -512 to 511, wherein the L-STF is generated by applying the first phase rotation value to an L-STF sequence, wherein the L-STF sequence is configured by repeating an L-STF sequence defined for a 20 MHz band, wherein the L-STF sequence defined for the 20 MHz band is sqrt(½)*[0 0 0 0 0 0 0 1 +j 0 0 0 -1-j 0 0 0 1 +j 0 0 0 -1 0 0 0 -1 -j 0 0 0 1 +j 0 0 0 0 0 0 -1 -j 0 0 0 -1 -j 0 0 0 1 +j 0 0 0 1 +j 0 0 0 1 +j 0 0 0 1 +j 0 0 0 0 0 0 0], wherein the L-LTF is generated by applying the first phase rotation value to an L-LTF sequence,
wherein the L-LTF sequence is configured by repeating an L-LTF sequence defined for a 20 MHz band, and
wherein the L-LTF sequence defined for the 20 MHz band is [0 0 0 0 0 0 1 1 −1 −1 1 1 −1 1 −1 1 1 1 1 1 1 −1 −1 1 1 −1 1 −1 1 1 1 1 0 1 −1 −1 1 1 −1 1 −1 1 1 −1 −1 −1 −1 −1 1 1 −1 −1 1 −1 1 −1 1 1 1 1 0 0 0 0 0].

* * * * *